US012087235B2

(12) United States Patent
Meng et al.

(10) Patent No.: US 12,087,235 B2
(45) Date of Patent: Sep. 10, 2024

(54) DISPLAY PANEL AND SENSING METHOD AND DRIVING METHOD THEREFOR

(71) Applicants: HEFEI BOE JOINT TECHNOLOGY CO., LTD., Hefei (CN); BOE TECHNOLOGY GROUP CO., LTD., Beijing (CN)

(72) Inventors: Song Meng, Beijing (CN); Jingbo Xu, Beijing (CN); Jianbo Xian, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/781,776

(22) PCT Filed: May 28, 2021

(86) PCT No.: PCT/CN2021/096759
§ 371 (c)(1),
(2) Date: Dec. 1, 2022

(87) PCT Pub. No.: WO2022/246800
PCT Pub. Date: Dec. 1, 2022

(65) Prior Publication Data

US 2024/0203361 A1 Jun. 20, 2024

(51) Int. Cl.
*G09G 5/10* (2006.01)
*G09G 3/3233* (2016.01)
*G09G 3/3275* (2016.01)

(52) U.S. Cl.
CPC ......... *G09G 3/3275* (2013.01); *G09G 3/3233* (2013.01); *G09G 2300/0819* (2013.01);
(Continued)

(58) Field of Classification Search
CPC ............... G09G 3/3233; G09G 3/3275; G09G 2300/0819; G09G 2300/0842; G09G 2310/08; G09G 2320/0233
See application file for complete search history.

(56) References Cited

U.S. PATENT DOCUMENTS 9,035,976 B2 5/2015 Lee et al.
10,204,565 B2 * 2/2019 Park .................... G09G 3/3291
(Continued)

FOREIGN PATENT DOCUMENTS

CN 103578411 A 2/2014
CN 104732920 A 6/2015
(Continued)

*Primary Examiner* — Joe H Cheng
(74) *Attorney, Agent, or Firm* — Dilworth & Barrese, LLP.; Michael J. Musella, Esq.

(57) ABSTRACT

An organic light-emitting diode display panel and a sensing method and a driving method therefor are provided. The organic light-emitting diode display panel includes a plurality of pixel units arranged in an array, each pixel unit includes a plurality of sub-pixels, and at least two sub-pixels are connected to a same sensing signal line. The sensing method includes: sequentially applying sensing data signals to the sub-pixels in the organic light-emitting diode display panel, and sequentially outputting sensing signals through sensing signal lines, to sense the sub-pixels, so as to compensate the sub-pixels. Among the sub-pixels connected to the same sensing signal line, sub-pixels, other than a sub-pixel which is currently sensed, are applied with a zero-gray-scale data signal.

20 Claims, 8 Drawing Sheets

(52) U.S. Cl.
CPC . *G09G 2300/0842* (2013.01); *G09G 2310/08* (2013.01); *G09G 2320/0233* (2013.01)

(56) References Cited

U.S. PATENT DOCUMENTS

| | | | | |
|---|---|---|---|---|
| 10,446,077 | B2 * | 10/2019 | Yang | G09G 3/3233 |
| 2014/0168184 | A1 * | 6/2014 | Kim | G09G 3/3233 345/79 |
| 2015/0179105 | A1 | 6/2015 | Mizukoshi | |
| 2015/0206477 | A1 * | 7/2015 | Xu | G09G 3/3266 345/82 |
| 2015/0379937 | A1 * | 12/2015 | Kim | G09G 3/3291 345/691 |
| 2018/0061296 | A1 | 3/2018 | Shim | |
| 2021/0104185 | A1 | 4/2021 | Park | |

FOREIGN PATENT DOCUMENTS

| | | | | |
|---|---|---|---|---|
| CN | 107799040 | A | | 3/2018 |
| CN | 108122541 | A | | 6/2018 |
| CN | 110956929 | A | * | 4/2020 |
| CN | 112599055 | A | | 4/2021 |
| KR | 10-2018-0130207 | A | | 12/2018 |
| KR | 20180130207 | A | * | 12/2018 |
| KR | 20200079962 | A | * | 7/2020 |

* cited by examiner

DISPLAY PANEL AND SENSING METHOD AND DRIVING METHOD THEREFOR

This application is the National Stage under 35 U.S.C. § 371 of PCT/CN2021/096759 filed on May 28, 2021, the disclosure of which is incorporated by reference.

TECHNICAL FIELD

Embodiments of the present disclosure relate to a sensing method and a driving method for an organic light-emitting diode display panel, and an organic light-emitting diode display panel.

BACKGROUND

With the development of technologies, organic light-emitting diode (OLED) display devices have attracted more and more attention due to the advantages of wide viewing angle, high contrast, fast response speed, and higher luminous brightness and lower driving voltage compared with inorganic light-emitting display devices. Because of the above characteristics, OLED can be applied to devices with display functions, such as mobile phones, monitors, notebook computers, digital cameras, instruments and meters, etc.

SUMMARY

At least one embodiment of the present disclosure provides a sensing method for an organic light-emitting diode display panel. The organic light-emitting diode display panel comprises a plurality of pixel units arranged in an array, each pixel unit comprises a plurality of sub-pixels, at least two sub-pixels are connected to a same sensing signal line. The method comprises: sequentially applying sensing data signals to the sub-pixels in the organic light-emitting diode display panel, and sequentially outputting sensing signals through sensing signal lines, to sense the sub-pixels, so as to compensate the sub-pixels. Among the sub-pixels connected to the same sensing signal line, sub-pixels, other than a sub-pixel which is currently sensed, are applied with a zero-gray-scale data signal.

For example, in the method provided by an embodiment of the present disclosure, sequentially applying the sensing data signals to the sub-pixels in the organic light-emitting diode display panel, and sequentially outputting the sensing signals through the sensing signal lines, comprises: sequentially applying the sensing data signals to an N-th row of sub-pixels, and sequentially outputting the sensing signals through the sensing signal lines to sense each sub-pixel among the N-th row of sub-pixels; and in response to completing sensing of the N-th row of sub-pixels, sequentially applying the sensing data signals to an (N+1)-th row of sub-pixels, and sequentially outputting the sensing signals through the sensing signal lines. N is a positive integer.

For example, in the method provided by an embodiment of the present disclosure, a driving phase of each frame of the organic light-emitting diode display panel comprises a display phase and a blanking phase, and a sensing phase of the sub-pixels is within the blanking phase.

For example, in the method provided by an embodiment of the present disclosure, the sub-pixels connected to the same sensing signal line belong to one sensing group. For the sub-pixels of a same sensing group, sensing phases of different sub-pixels are within blanking phases of different frames, or sensing phases of at least two sub-pixels are within the blanking phase of a same frame.

For example, in the method provided by an embodiment of the present disclosure, the sub-pixels connected to the same sensing signal line belong to one sensing group, and for the sub-pixels of a same sensing group, the sub-pixels are sequentially sensed along a row direction.

For example, in the method provided by an embodiment of the present disclosure, the sub-pixels connected to the same sensing signal line belong to one sensing group. For the sub-pixels of a same sensing group, the sub-pixels are sensed according to a preset order, and the preset order is different from an order in which the sub-pixels are arranged along a row direction.

For example, in the method provided by an embodiment of the present disclosure, the sub-pixels connected to the same sensing signal line belong to one sensing group, and the sub-pixels of a same sensing group are numbered from a first sub-pixel to an M-th sub-pixel. Sequentially applying the sensing data signals to the sub-pixels in the organic light-emitting diode display panel, and sequentially outputting the sensing signals through the sensing signal lines, comprises: applying the sensing data signals to P-th sub-pixels in the organic light-emitting diode display panel, and outputting the sensing signals through the sensing signal lines, to sense each P-th sub-pixel in the organic light-emitting diode display panel; and in response to completing sensing the P-th sub-pixels in the organic light-emitting diode display panel, applying the sensing data signals to (P+1)-th sub-pixels in the organic light-emitting diode display panel, and outputting the sensing signals through the sensing signal lines. $M>1$ and M is an integer, $1 \leq P \leq M-1$ and P is an integer.

For example, in the method provided by an embodiment of the present disclosure, applying the sensing data signals to the P-th sub-pixels in the organic light-emitting diode display panel, and outputting the sensing signals through the sensing signal lines, comprises: applying the sensing data signals to the P-th sub-pixels row by row, and outputting the sensing signals through the sensing signal lines.

For example, in the method provided by an embodiment of the present disclosure, a driving phase of each frame of the organic light-emitting diode display panel comprises a display phase and a blanking phase, and a sensing phase of the sub-pixels is within the blanking phase.

For example, in the method provided by an embodiment of the present disclosure, for P-th sub-pixels in a same column, sensing phases of different P-th sub-pixels are within blanking phases of different frames, or sensing phases of at least two P-th sub-pixels are within the blanking phase of a same frame.

For example, in the method provided by an embodiment of the present disclosure, P-th sub-pixels in a same row are simultaneously sensed. For P-th sub-pixels in a same column, the P-th sub-pixels are sequentially sensed along a column direction.

For example, in the method provided by an embodiment of the present disclosure, for the sub-pixels of the same sensing group, the first sub-pixel to the M-th sub-pixel are sequentially arranged along a row direction, or, the first sub-pixel to the M-th sub-pixel are arranged out of order along the row direction.

For example, in the method provided by an embodiment of the present disclosure, the sub-pixels connected to the same sensing signal line belong to a same pixel unit or belong to different pixel units, and the sub-pixels of each pixel unit are in a same row.

For example, in the method provided by an embodiment of the present disclosure, for the sub-pixels connected to the same sensing signal line, durations of sensing phases of respective sub-pixels are not exactly identical.

For example, in the method provided by an embodiment of the present disclosure, a sensing phase of the sub-pixels is within a shutdown compensation phase of the organic light-emitting diode display panel.

For example, in the method provided by an embodiment of the present disclosure, each pixel unit comprises four sub-pixels, and the four sub-pixels comprise a red sub-pixel, a green sub-pixel, a blue sub-pixel, and a white sub-pixel.

For example, in the method provided by an embodiment of the present disclosure, each sub-pixel comprises a pixel circuit, and the pixel circuit comprises a driving circuit, a data writing circuit, a storage circuit, and a sensing circuit; the driving circuit is connected to a light-emitting element and is configured to control a driving current for driving the light-emitting element to emit light; the data writing circuit is connected to the driving circuit and is configured to write a sensing data signal, the zero-gray-scale data signal, or a display data signal into the driving circuit in response to a first scanning signal; the storage circuit is connected to the driving circuit and the data writing circuit, and is configured to store the sensing data signal, the zero-gray-scale data signal, or the display data signal written by the data writing circuit; and the sensing circuit is connected to the driving circuit, the light-emitting element, and the sensing signal line, and is configured to transmit a signal flowing through the driving circuit to the sensing signal line in response to a second scanning signal, so as to output a sensing signal through the sensing signal line.

At least one embodiment of the present disclosure further provides a driving method for an organic light-emitting diode display panel. The driving method comprises: in a display phase, writing display data signals to the sub-pixels of the organic light-emitting diode display panel to enable the organic light-emitting diode display panel to display; and in a non-display phase, using the sensing method for the organic light-emitting diode display panel according to any embodiment of the present disclosure to sense the sub-pixels of the organic light-emitting diode display panel, so as to compensate the sub-pixels.

At least one embodiment of the present disclosure further provides an organic light-emitting diode display panel, which comprises a timing controller, a gate driver, a data driver, and a plurality of pixel units arranged in an array. Each pixel unit comprises a plurality of sub-pixels, and at least two sub-pixels are connected to a same sensing signal line; the timing controller is connected to the gate driver and the data driver, and the timing controller is configured to provide a first control signal to the gate driver to control the gate driver to output a first scanning signal and a second scanning signal, and provide a second control signal to the data driver to control the data driver to output a sensing data signal and a zero-gray-scale data signal; the gate driver is configured to apply the first scanning signal and the second scanning signal to the sub-pixels in the organic light-emitting diode display panel under control of the first control signal; the data driver is configured to apply the sensing data signal and the zero-gray-scale data signal to the sub-pixels in the organic light-emitting diode display panel under control of the second control signal; and the sub-pixels output sensing signals through sensing signal lines in response to the first scanning signal, the second scanning signal, and the sensing data signal, to realize sensing of the sub-pixels, so as to compensate the sub-pixels. Among the sub-pixels connected to the same sensing signal line, sub-pixels, other than a sub-pixel which is currently sensed, are applied with the zero-gray-scale data signal.

For example, in the organic light-emitting diode display panel provided by an embodiment of the present disclosure, the gate driver is further configured to apply the first scanning signal and the second scanning signal to an N-th row of sub-pixels for multiple times under control of the first control signal; the data driver is further configured to apply the sensing data signal to each sub-pixel in the N-th row of sub-pixels respectively under control of the second control signal, and the N-th row of sub-pixels are not applied with the sensing data signal at same time; and after each sub-pixel in the N-th row of sub-pixels outputs the sensing signals through the sensing signal lines to complete sensing of the N-th row of sub-pixels, an (N+1)-th row of sub-pixels receive signals provided by the gate driver and the data driver and start sensing. N is a positive integer.

For example, in the organic light-emitting diode display panel provided by an embodiment of the present disclosure, the sub-pixels connected to the same sensing signal line belong to one sensing group, and the sub-pixels of a same sensing group are numbered from a first sub-pixel to an M-th sub-pixel; the gate driver is further configured to output the first scanning signal and the second scanning signal row by row under control of the first control signal; the data driver is further configured to apply the sensing data signal to P-th sub-pixels in the organic light-emitting diode display panel under control of the second control signal; and after each P-th sub-pixel in the organic light-emitting diode display panel outputs the sensing signals through the sensing signal lines to complete sensing of each P-th sub-pixel, (P+1)-th sub-pixels in the organic light-emitting diode display panel receive signals provided by the gate driver and the data driver and start sensing. $M>1$ and M is an integer, $1 \leq P \leq M-1$ and P is an integer.

BRIEF DESCRIPTION OF THE DRAWINGS

In order to clearly illustrate the technical solutions of the embodiments of the present disclosure, the drawings of the embodiments will be briefly described in the following: it is obvious that the described drawings are only related to some embodiments of the present disclosure and thus are not limitative to the present disclosure.

DETAILED DESCRIPTION

Figure 1:
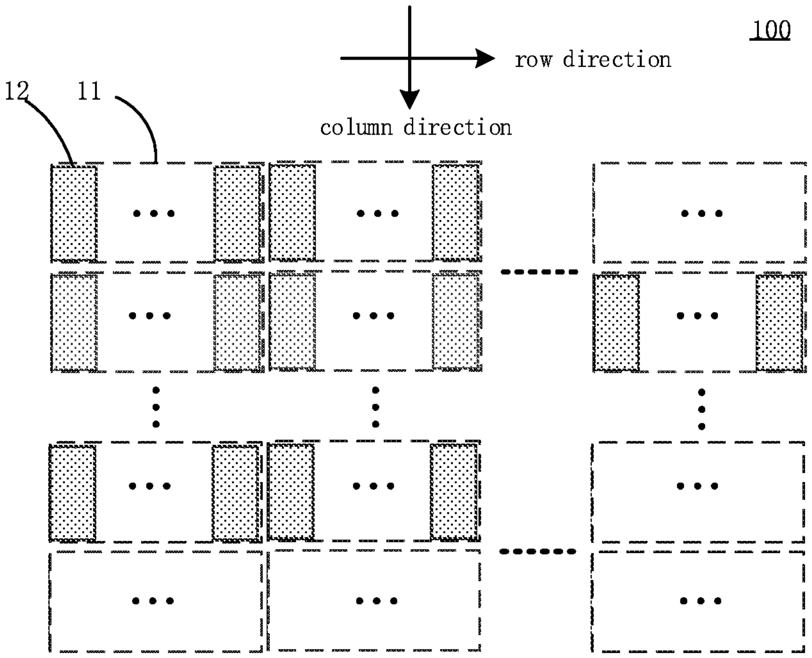
FIG. 1 is a schematic diagram of an organic light-emitting diode display panel to which a sensing method is applicable provided by some embodiments of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Pixel circuits in OLED display devices generally adopt a matrix driving mode, which can be divided into an active matrix (AM) driving and a passive matrix (PM) driving according to whether switching components are introduced into each pixel unit. Although PMOLED has simple process and low cost, it cannot meet the demand of high-resolution and large-size display due to the shortcomings of cross-talk, high power consumption and short lifetime. In contrast, AMOLED integrates a group of thin film transistors and storage capacitors in the pixel circuit of each pixel. By driving and controlling the thin film transistors and storage capacitors, the current flowing through the OLED can be controlled, so that the OLED can emit light as needed. Compared with PMOLED, AMOLED requires less driving current, has lower power consumption and longer lifetime, which can meet the demand of large-size display with high resolution and multiple gray levels. Meanwhile, AMOLED has obvious advantages in viewing angle, color reproduction, power consumption and response time, which is suitable for display devices with high information content and high resolution.

Characteristics of transistors in pixel circuits are the main factors that affect the display picture quality. The characteristics of transistor materials are inconsistent in space and degraded in time. Whether amorphous silicon, polysilicon, or metal oxide semiconductor, there are different forms of threshold voltage deviation. For example, OLED is a current-driven device, and the current value directly determines the brightness of OLED (that is, the display gray scale), and the uniformity of a driving transistor of OLED affects the uniformity of the current of respective pixels. During the manufacturing process of thin film transistors of large-size AMOLED, there may be unevenness in the process, which makes the uniformity of the driving transistors of respective pixels to be poor, thus causing the problem that in the case where the voltage supplied to each driving transistor is the same, currents generated by respective driving transistors are different, and then the brightness of respective pixels is different.

For example, in the case where the transistor is used for a period of time, because a gate electrode of the transistor is always biased at a certain voltage (such as high voltage or low voltage), the threshold voltage of the transistor is shifted, which further affects the display quality. The shifting of the threshold voltage of the transistor may cause the current supplied to the light-emitting element (such as OLED) in the pixel to change, thus causing the brightness of the OLED to change. In addition, shifting degrees of threshold voltages of respective transistors are different, which may also lead to the uneven brightness of the display panel, reduce the brightness uniformity of the display panel, and even display spots or patterns in the region, and mura or afterimage is occurred. Moreover, factors, such as the IR drop of a voltage source and an OLED aging may also affect the brightness uniformity of display screen. Therefore, compensation technology is needed to enable the brightness of pixels to reach an ideal value.

Common compensation schemes include an internal compensation and an external compensation. The external compensation is to monitor the current value flowing through the driving transistor through a peripheral circuit, and then compensate the driving transistor according to the current value of each pixel. Compared with the internal compensation, the external compensation has better compensation effect.

An electrical compensation is the most commonly used external compensation technology. The electrical compensation is to detect the current value flowing through the driving transistor through the cooperation of the pixel circuit and the peripheral circuit, so as to obtain the characteristic parameters of the driving transistor (for example, the threshold voltage and the mobility rate), and use the obtained characteristic parameters to properly correct data signals input to the corresponding sub-pixel to achieve the purpose of compensation. When sensing the characteristic parameters of the driving transistor, it is possible to write a sensing data signal to the driving transistor, then receive the current flowing through the driving transistor as the sensing signal, calculate the change amount of the threshold voltage of the driving transistor according to the sensing signal, and calculate the mobility rate of the driving transistor, thereby obtaining the shifting value of data compensation. The electrical compensation needs to detect each sub-pixel and calculate the compensation data of each sub-pixel for the compensation of the corresponding sub-pixel. The electrical compensation includes a real-time compensation and a shutdown compensation. The real-time compensation is compensation when the display panel works, and the shutdown compensation is compensation before the display panel shuts down.

Generally, the operation of sensing the characteristic parameters of the driving transistor is performed in units of pixels or sub-pixels. In order to improve the pixel aperture ratio, a pixel structure in which two or more adjacent pixels or sub-pixels share a sensing signal line can also be adopted. For example, the sensing signal line is a trace for transmitting the sensing signal. Because a plurality of pixels or sub-pixels share the sensing signal line, it is impossible to sense each sub-pixel in the traditional way. In this case, how to sense each pixel or sub-pixel and improve the sensing performance becomes an urgent problem to be solved.

At least one embodiment of the present disclosure provides a sensing method and a driving method for an organic light-emitting diode display panel. The sensing method can reduce the amount of sensing signal lines and improve the pixel aperture ratio, as well as realize the sensing of full-screen sub-pixels, improve the sensing efficiency and stability, and realize the real-time compensation or the shutdown compensation.

Next, embodiments of the present disclosure are described in detail with reference to the accompanying drawings. It should be noted that the same reference numerals in different drawings are used to refer to the same elements already described.

At least one embodiment of the present disclosure provides a sensing method for an organic light-emitting diode display panel. The organic light-emitting diode display panel includes a plurality of pixel units arranged in an array, each pixel unit includes a plurality of sub-pixels, and at least two sub-pixels are connected to a same sensing signal line. The sensing method includes: sequentially applying sensing data signals to the sub-pixels in the organic light-emitting diode display panel, and sequentially outputting sensing signals through the sensing signal lines to sense the sub-pixels, so as to compensate the sub-pixels. Among the sub-pixels connected to the same sensing signal line, sub-pixels, other than the sub-pixel which is currently sensed, are applied with a zero-gray-scale data signal.

FIG. 1 is a schematic diagram of an organic light-emitting diode display panel to which a sensing method is applicable provided by some embodiments of the present disclosure. As shown in FIG. 1, the OLED display panel 100 includes a plurality of pixel units 11 arranged in an array, and each pixel unit 11 includes a plurality of sub-pixels 12. The sub-pixels 12 in each pixel unit 11 are sequentially arranged along a row direction. The amount of sub-pixels 12 included in each pixel unit 11 is not limited, and can be any value, such as 2, 3, 4, etc., which can be determined according to actual requirements, and the embodiments of the present disclosure are not limited to this case. All the pixel units 11 in the OLED display panel 100 are arranged in an array, and correspondingly, all the sub-pixels 12 in the OLED display panel 100 are arranged in a plurality of rows and a plurality of columns to form a pixel array.

Figure 2:
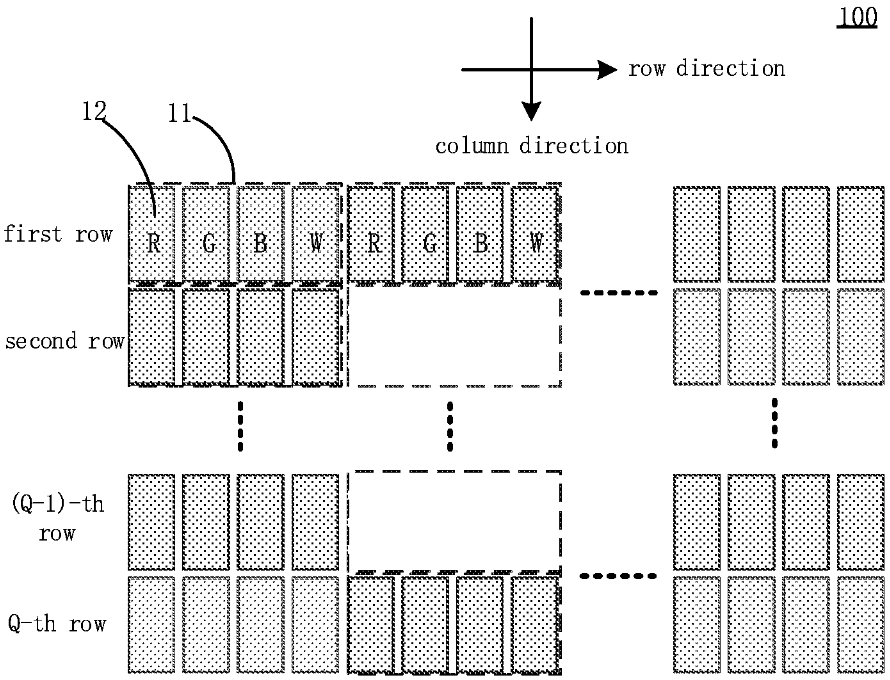
FIG. 2 is a schematic diagram of a specific example of an organic light-emitting diode display panel to which a sensing method is applicable provided by some embodiments of the present disclosure.

FIG. 2 is a schematic diagram of a specific example of an organic light-emitting diode display panel to which a sensing method is applicable provided by some embodiments of the present disclosure. As shown in FIG. 2, in some examples, each pixel unit 11 in the OLED display panel 100 includes four sub-pixels 12, and the four sub-pixels 12 include a red sub-pixel R, a green sub-pixel G, a blue sub-pixel B, and a white sub-pixel W arranged in sequence along the row direction. Of course, the embodiments of the present disclosure are not limited to this case. Each pixel unit 11 is not limited to include sub-pixels of RGBW type, sub-pixels of other arbitrary colors can also be used. The arrangement order of sub-pixels can be determined according to actual requirements. For example, the plurality of pixel units 11 can be arranged in Q rows, where Q is an arbitrary positive integer.

Figure 3A:
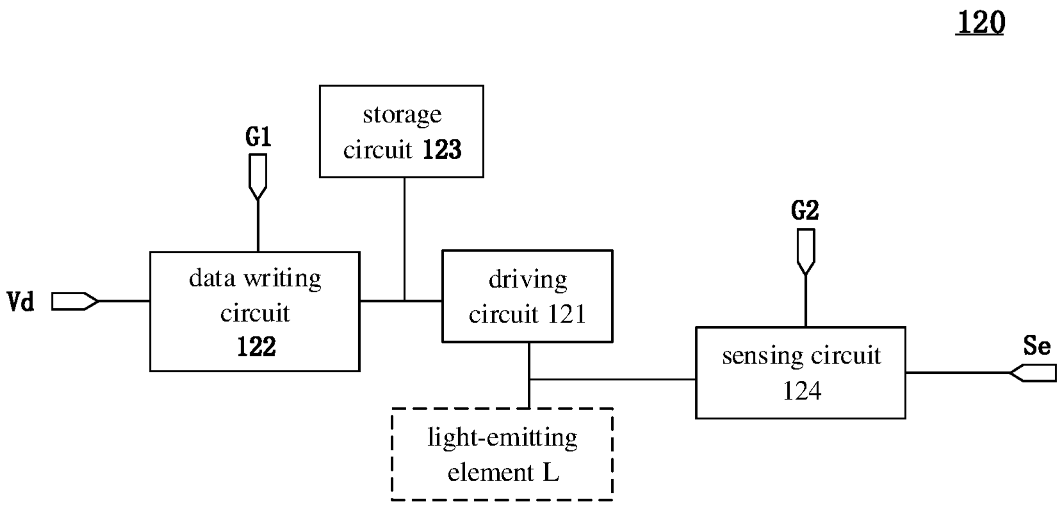
FIG. 3A is a schematic block diagram of a pixel circuit in an organic light-emitting diode display panel provided by some embodiments of the present disclosure.

FIG. 3A is a schematic block diagram of a pixel circuit in an organic light-emitting diode display panel provided by some embodiments of the present disclosure. As shown in FIG. 3A, each sub-pixel 12 includes a pixel circuit 120, the pixel circuit 120 includes a driving circuit 121, a data writing circuit 122, a storage circuit 123, and a sensing circuit 124.

The driving circuit 121 is connected to a light-emitting element L and is configured to control a driving current for driving the light-emitting element L to emit light. The data writing circuit 122 is connected to the driving circuit 121, and is configured to write a sensing data signal, a zero-gray-scale data signal, or a display data signal into the driving circuit 121 in response to a first scanning signal. For example, the data writing circuit 122 is connected to a first scanning line G1 and a data line Vd, so as to receive the first scanning signal and the data signal, respectively.

For example, the data signal may be the sensing data signal, the zero-gray-scale data signal, or the display data signal. The sensing data signal is a data signal written during sensing, which is used to obtain the sensing signal and performing the external compensation. The zero-gray-scale data signal is a data signal corresponding to the zero gray scale. In the case where the zero-gray-scale data signal is written, the corresponding sub-pixel displays the zero gray scale, that is, the corresponding sub-pixel does not emit light. For example, the zero-gray-scale data signal is approximately 0V. The display data signal is a data signal that needs to be written during normal display, so as to display a corresponding image based on the display data signal.

The storage circuit 123 is connected to the driving circuit 121 and the data writing circuit 122, and is configured to store the sensing data signal, the zero-gray-scale data signal, or the display data signal written by the data writing circuit 122. The sensing circuit 124 is connected to the driving circuit 121, the light-emitting element L, and a sensing signal line Se, and is configured to transmit a signal flowing through the driving circuit 121 to the sensing signal line Se in response to a second scanning signal, so as to output the sensing signal through the sensing signal line Se. For example, the sensing circuit 124 is also connected to a second scanning line G2 to receive the second scanning signal.

It should be noted that in the embodiments of the present disclosure, the pixel circuit 120 may also include other sub-circuits, not limited to the above-described driving circuit 121, data writing circuit 122, storage circuit 123 and sensing circuit 124. For example, the pixel circuit 120 may further include a reset circuit, a light-emitting control circuit, an internal compensation circuit, etc., so as to achieve more comprehensive functions, which is not limited by the embodiments of the present disclosure.

Figure 3B:
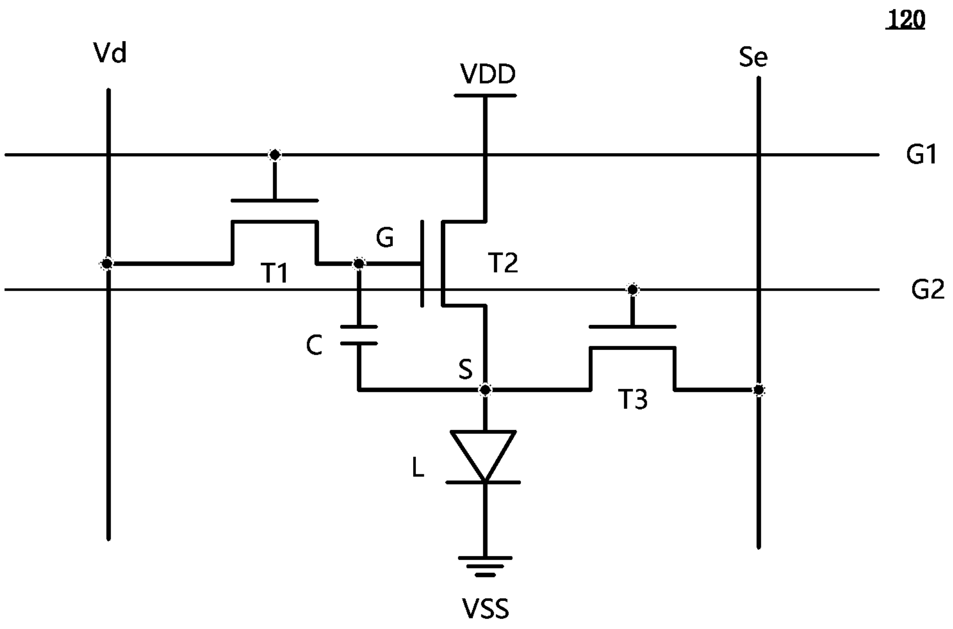
FIG. 3B is a schematic circuit diagram of the pixel circuit shown in FIG. 3A.

FIG. 3B is a schematic circuit diagram of the pixel circuit shown in FIG. 3A. As shown in FIG. 3B, in some examples, the pixel circuit 120 may be implemented as a first transistor T1, a second transistor T2, a third transistor T3, and a storage capacitor C.

For example, the data writing circuit 122 may be implemented as the first transistor T1. A gate electrode of the first transistor T1 is connected to a first scanning line G1 to receive the first scanning signal, a first electrode of the first transistor T1 is connected to the data line Vd to receive the sensing data signal, the zero-gray-scale data signal, or the display data signal, and a second electrode of the first transistor T1 is connected to a first node G.

For example, the driving circuit 121 may be implemented as the second transistor T2. A gate electrode of the second transistor T2 is connected to the first node G, a first electrode of the second transistor T2 is connected to a first voltage terminal VDD to receive a first voltage signal, and a second electrode of the second transistor T2 is connected to a second node S. For example, the first voltage terminal VDD is configured to provide a DC high level signal, and the DC high level signal is called the first voltage signal.

The storage circuit 123 can be implemented as the storage capacitor C. A first electrode of the storage capacitor C is connected to the first node G, and a second electrode of the storage capacitor C is connected to the second node S.

The sensing circuit 124 may be implemented as the third transistor T3. A gate electrode of the third transistor T3 is connected to a second scanning line G2 to receive the second scanning signal, a first electrode of the third transistor T3 is connected to the second node S, and a second electrode of the third transistor T3 is connected to the sensing signal line Se to transmit the sensing signal to the sensing signal line Se.

An anode of the light-emitting element L is connected to the second node S, and a cathode of the light-emitting element L is connected to a second voltage terminal VSS to receive a second voltage signal. For example, the second voltage terminal VSS is configured to provide a DC low level signal, such as being grounded, and the DC low level signal is called the second voltage signal. The light-emitting element Lis, for example, an OLED.

For example, during sensing, the first transistor T1 is turned on in response to the first scanning signal provided by the first scanning line G1, and the sensing data signal provided by the data line Vd is written into the first node G, so that the second transistor T2 is turned on under the control of the first node G. At this time, the third transistor T3 is turned on in response to the second scanning signal provided by the second scanning line G2, and the current flowing through the second transistor T2 is transmitted to the sensing signal line Se, which is then detected by a separately provided peripheral circuit to calculate the threshold voltage, mobility rate, etc., thus used for performing the compensation.

Figure 4:
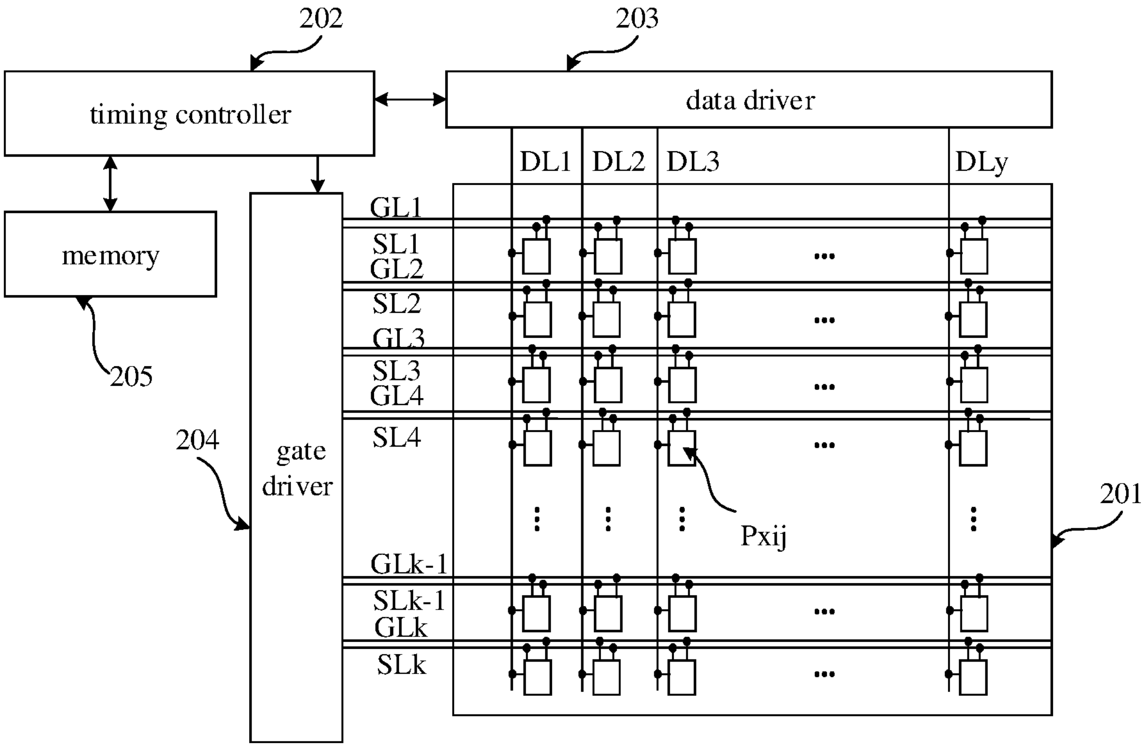
FIG. 4 is a structural schematic diagram of an organic light-emitting diode display panel provided by some embodiments of the present disclosure.

FIG. 4 is a structural schematic diagram of an organic light-emitting diode display panel provided by some embodiments of the present disclosure. As shown in FIG. 4, the display panel of the exemplary embodiment includes a pixel array 201 and a panel driver. The panel driver is configured to drive the pixel array 201. The panel driver may include a timing controller 202, a data driver 203, a gate driver 204, and a memory 205 for storing the compensation data.

In some exemplary embodiments, the pixel array 201 may include: a plurality of scanning signal lines (for example, GL1 to GLk), a plurality of data signal lines (for example, DL1 to DLy), a plurality of sensing control lines (for example, SL1 to SLk), a plurality of sensing signal lines (not shown in the figure), and a plurality of sub-pixels Pxij, where k and y are both positive integers. For example, the scanning signal lines GL1 to GLk may be the first scanning line G1 in the foregoing embodiments, the data signal lines DL1 to DLy may be the data line Vd in the foregoing embodiments, and the sensing control lines SL1 to SLk may be the second scanning line G2 in the foregoing embodiments.

In some exemplary embodiments, the plurality of scanning signal lines GL1 to GLk and the plurality of sensing control lines SL1 to SLk are formed in a first direction (for example, a horizontal direction) of the display panel, and the plurality of data signal lines DL1 to DLy and the plurality of sensing signal lines may be formed in a second direction (for example, a vertical direction) of the display panel. The first direction and the second direction intersect, for example, the first direction is perpendicular to the second direction. The plurality of data signal lines and the plurality of sensing signal lines are configured to intersect with the plurality of scanning signal lines and the plurality of sensing control lines.

In some exemplary embodiments, the timing controller 202 may provide the data driver 203 with gray values and control signals suitable for the specifications of the data driver 203. The data driver 203 can generate the data voltages to be supplied to the data signal lines DL1 to DLy by using the gray values and control signals received from the timing controller 202. For example, the data driver 203 can sample the gray values by using a clock signal and apply the data voltages corresponding to the gray values to the data signal lines DL1 to DLy in a unit of sub-pixel row.

In some exemplary embodiments, the timing controller 202 may provide a clock signal, a scanning start signal, a sensing start signal, etc. suitable for the specifications of the gate driver 204 to the gate driver 204. The gate driver 204 can generate the scanning signals (for example, the first scanning signal of the foregoing embodiments) to be provided to the scanning signal lines GL1 to GLk and sensing control signals (for example, the second scanning signal of the foregoing embodiments) to be provided to the sensing control lines SL1 to SLk by receiving the clock signal, the scanning start signal, the sensing start signal, and the like from the timing controller 202. For example, the gate driver 204 may include a scanning driving circuit and a sensing driving circuit. The scanning driving circuit may sequentially supply scanning signals with turn-on-level pulses to the scanning signal lines GL1 to GLk. The sensing driving circuit may sequentially supply sensing control signals with turn-on-level pulses to the sensing control lines SL1 to SLk. For example, the scanning driving circuit may be configured in the form of a shift register, and may generate the scanning signal in such a way that the scanning start signal provided in the form of turn-on-level pulses is sequentially transmitted to a next stage of circuit under the control of the scanning clock signal. The sensing driving circuit may be configured in the form of a shift register, and may generate the sensing control signals in such a way that the sensing control signals provided in the form of turn-on-level pulses are sequentially transmitted to a next stage of circuit under the control of the sensing clock signal.

In some exemplary embodiments, the data driver 203 can acquire sensing data through the sensing signal line and transmit the sensing data to the timing controller 202. The timing controller 202 can determine compensation data of the electrical characteristic parameters of the driving transistor according to the sensed data and store the compensation data in the memory 205. In some examples, the memory 205 may store compensation data of the electrical characteristic parameters of the driving transistors included in the display panel, and may also store optical compensation data of the light-emitting elements of the display panel. However, the embodiments of the present disclosure are not limited to this case.

In some exemplary embodiments, the scanning driving circuit and the sensing driving circuit included in the gate driver 204 may be located on opposite sides of the pixel array 201 (for example, the left side and the right side of the pixel array 201). However, the embodiments of the present disclosure are not limited to this case. For example, the gate drivers are arranged on both sides that are opposite of the pixel array 201, so as to realize bilateral driving of sub-pixels.

In some exemplary embodiments, the gate driver 204 may be formed using an integrated circuit, or may be directly formed on the substrate of the display panel during the process of preparing the pixel circuit of the sub-pixel. However, the embodiments of the present disclosure are not limited to this case.

In some exemplary embodiments, each sub-pixel Pxij in the pixel array 201 may be connected to a corresponding data signal line, scanning signal line, sensing control line and sensing signal line, and i and j may be natural numbers. The sub-pixel Pxij may refer to a sub-pixel in which a transistor is connected to an i-th scanning signal line and a j-th data signal line.

Figure 5:
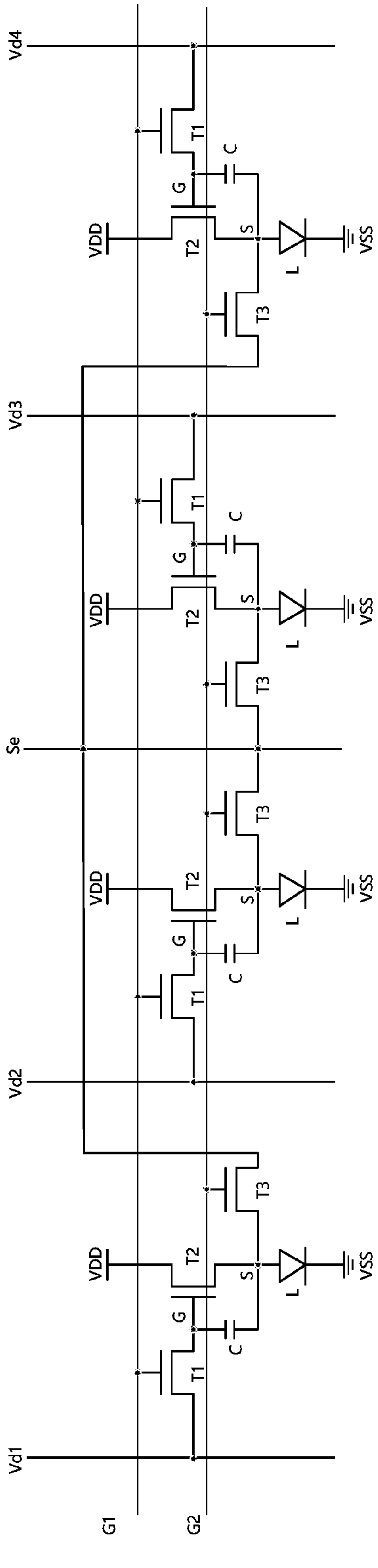
FIG. 5 is a schematic circuit diagram of a plurality of pixel circuits in an organic light-emitting diode display panel provided by some embodiments of the present disclosure.

FIG. 5 is a schematic circuit diagram of a plurality of pixel circuits in an organic light-emitting diode display panel provided by some embodiments of the present disclosure. For example, in some examples, as shown in FIG. 5, in order to reduce the amount of sensing signal lines and improve the pixel aperture ratio, a plurality of sub-pixels 12 can share one sensing signal line Se, that is, at least two sub-pixels 12 are connected to the same sensing signal line Se. For example, in this example, four adjacent sub-pixels 12 in the same row share the same sensing signal line Se. For example, the second electrodes of the third transistors T3 in the four adjacent pixel circuits 120 are connected to the same sensing signal line Se, so as to transmit sensing signals in a time division multiplexing way.

For example, each row of sub-pixels 12 are connected to the same first scanning line G1 and the same second scanning line G2, that is, each row of sub-pixels 12 are connected to two scanning lines. Therefore, the first scanning signal transmitted by the first scanning line G1 can control whether the first transistors T1 in all pixel circuits 120 in the same row are turned on, and the second scanning signal transmitted by the second scanning line G2 can control whether the third transistors T3 in all pixel circuits 120 in the same row are turned on.

For the sub-pixels 12 connected to the same sensing signal line Se, respective sub-pixels 12 are connected to different data lines Vd, for example, connected to data lines Vd1, Vd2, Vd3, and Vd4, respectively. Therefore, the sensing data signals are written through the respective data lines Vd, and the characteristics of the second transistors T2 (that is, the driving transistors) in respective sub-pixels 12 can be detected through the cooperation of the first scanning signal and the second scanning signal.

For example, the sub-pixels 12 connected to the same sensing signal line Se may belong to the same pixel unit 11 or belong to different pixel units 11. For example, all sub-pixels 12 in the same one pixel unit 11 may be connected to the same one sensing signal line Se, alternatively, some sub-pixels 12 in one pixel unit 11 and some sub-pixels 12 in another pixel unit 11 may be connected to the same one sensing signal line Se. For example, the sub-pixels 12 of each pixel unit 11 are located in the same row.

It should be noted that in the embodiment of the present disclosure, the amount of sub-pixels 12 connected to the same sensing signal line Se is not limited to 4, but can also be any number, such as 2, 3, 5, 6, 8, etc. The sub-pixels 12 connected to the same sensing signal line Se may belong to the same one pixel unit 11 or belong to different pixel units 11, which is not limited by the embodiments of the present disclosure.

It should be noted that in the descriptions of various embodiments of the present disclosure, the first node G and the second node S do not represent actual components, but represent the meeting points of related electrical connections in the circuit diagram.

It should be noted that the transistors used in the embodiments of the present disclosure can all be thin film transistors, field effect transistors or other switching elements with the same characteristics, and the embodiments of the present disclosure are described by taking the thin film transistors as examples. A source electrode and a drain electrode of the transistor used here can be symmetrical in structure, so there is no difference in structure between the source electrode and the drain electrode. In the embodiments of the present disclosure, in order to distinguish the two electrodes of the transistor except the gate electrode, one electrode is directly described as the first electrode and the other electrode is the second electrode.

In addition, the transistors in the embodiments of the present disclosure are all explained by taking the N-type transistor as an example. In this case, the first electrode of the transistor is the drain electrode and the second electrode of the transistor is the source electrode. It should be noted that the present disclosure includes but is not limited to this case. For example, one or more transistors in the pixel circuit 120 provided by the embodiments of the present disclosure can also adopt P-type transistors, in which case, the first electrode of the transistors is the source electrode and the second electrode is the drain electrode, and it is only necessary to connect the electrodes of the selected type of transistors with reference to the electrodes of the corresponding transistors in the embodiments of the present disclosure and enable the corresponding signal lines to provide corresponding signals. When the N-type transistors are used, indium gallium zinc oxide (IGZO) can be used as an active layer of the thin film transistor. Compared with using low temperature poly silicon (LTPS) or amorphous silicon (such as hydrogenated amorphous silicon) as the active layer of thin film transistor, the size of transistor can be effectively reduced and leakage current can be prevented.

Figure 6:
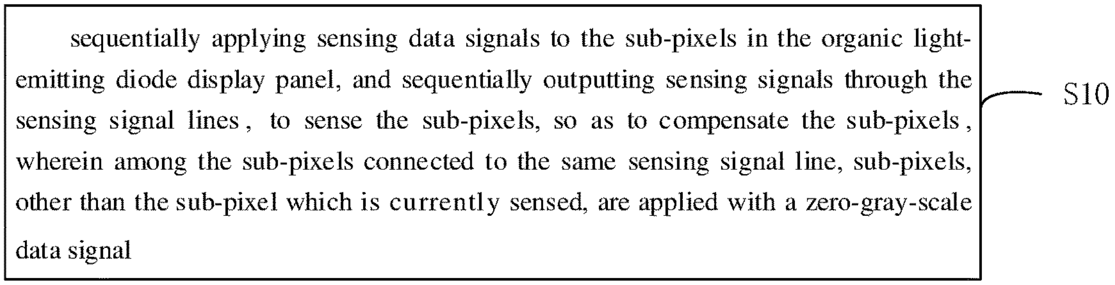
FIG. 6 is a schematic flowchart of a sensing method for an organic light-emitting diode display panel provided by some embodiments of the present disclosure.

FIG. 6 is a flowchart of a sensing method for an organic light-emitting diode display panel provided by some embodiments of the present disclosure. For example, the sensing method can be used for sensing the OLED display panel 100 shown in FIG. 1 to FIG. 5, at least two sub-pixels 12 in the OLED display panel 100 are connected to the same sensing signal line Se. For example, as shown in FIG. 6, the sensing method includes following operations.

Step S10: sequentially applying sensing data signals to the sub-pixels in the organic light-emitting diode display panel, and sequentially outputting sensing signals through the sensing signal lines, to sense the sub-pixels, so as to compensate the sub-pixels.

For example, in step S10, the sensing data signals can be sequentially applied to the sub-pixels 12 in the OLED display panel 100, and the sensing signals can be sequentially output through the sensing signal lines Se to sense the sub-pixels 12, so as to compensate the sub-pixels 12. For example, the sensing signals are transmitted to a separately provided circuit through the sensing signal lines Se, and this circuit can detect the sensing signals and calculate based on the sensing signals, thereby realizing the compensation.

For example, the sensing data signal is written into the pixel circuit 120 of the sub-pixel 12, and the pixel circuit 120 outputs the sensing signal to the sensing signal line Se. For example, among the sub-pixels 12 connected to the same sensing signal line Se, the sub-pixels 12, other than the sub-pixel 12 which is currently sensed, are applied with a zero-gray-scale data signal. That is, in the case where the circuit structure shown in FIG. 5 is adopted, a plurality of sub-pixels 12 are connected to the same sensing signal line Se, when a certain sub-pixel 12 is currently sensed, in order to avoid signal interference, it is needed to write the zero-gray-scale data signal into other sub-pixels 12. At this time, the second transistor T2 in the sub-pixels 12 where the zero-gray-scale data signal is written is turned off, so that no current flows from these sub-pixels 12 to the sensing signal line Se, and only the current output by the sensed sub-pixel 12 is transmitted on the sensing signal line Se. For example, the sensing data signal is different from the zero-gray-scale data signal.

For example, as shown in FIG. 5, four sub-pixels 12 are connected to the same sensing signal line Se. In the case where the first sub-pixel 12 needs to be sensed, the sensing data signal is written to the first sub-pixel 12 through the data line Vd1, and the zero-gray-scale data signal is written to the second sub-pixel 12, the third sub-pixel 12, and the fourth sub-pixel 12 through the data line Vd2, the data line Vd3, and data line Vd4. Furthermore, the first scanning line G1 and the second scanning line G2 provide the effective first scanning signal and the effective second scanning signal, respectively, so as to control the first transistor T1 and the third transistor T3 in all sub-pixels 12 in this row to be turned on.

At this time, because the zero-gray-scale data signal is written, the second transistor T2 in the second sub-pixel 12, the second transistor T2 in the third sub-pixel 12, and the second transistor T2 in the fourth sub-pixel 12 are all turned off, and no current flows from the second sub-pixel 12, the third sub-pixel 12, and the fourth sub-pixel 12 to the sensing signal line Se. Because the sensing data signal is written, the second transistor T2 in the first sub-pixel 12 is turned on, and the current flowing through the second transistor T2 flows to the sensing signal line Se through the third transistor T3. Therefore, the sensing signal transmitted on the sensing signal line Se at this time reflects the characteristics of the second transistor T2 in the first sub-pixel 12, and can be used for subsequent calculation and compensation. Similarly, the second sub-pixel 12, the third sub-pixel 12, and the fourth sub-pixel 12 can be sensed by using a similar method, as long as the sensed data signal is applied to the sub-pixel 12 to be sensed, and the zero-gray-scale data signal is applied to the sub-pixels 12 except the sub-pixel 12 to be sensed.

Figure 7:
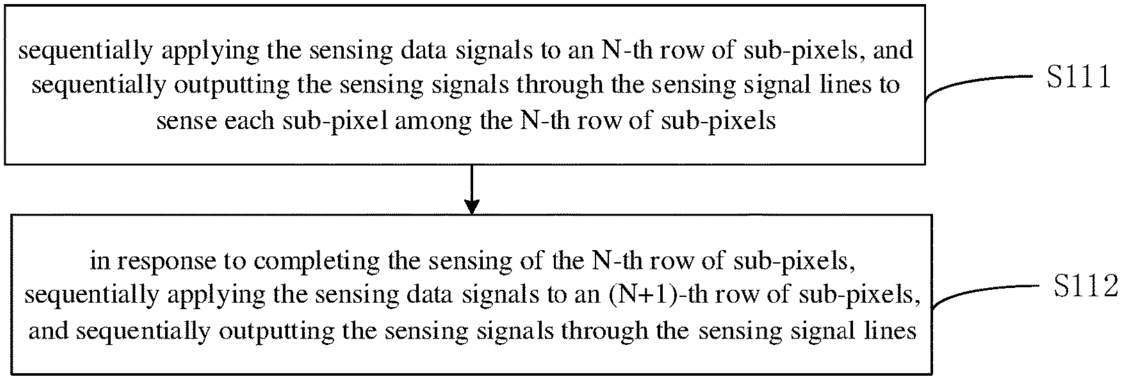
FIG. 7 is a schematic flowchart of step S10 in FIG. 6.

FIG. 7 is a schematic flowchart of step S10 in FIG. 6. For example, in some examples, as shown in FIG. 7, the above step S10 may further include following operations.

Step S111: sequentially applying the sensing data signals to an N-th row of sub-pixels, and sequentially outputting the sensing signals through the sensing signal lines, so as to sense each sub-pixel among the N-th row of sub-pixels.

Step S112: in response to completing the sensing of the N-th row of sub-pixels, sequentially applying the sensing data signals to an (N+1)-th row of sub-pixels, and sequentially outputting the sensing signals through the sensing signal lines.

For example, in step S111, N is a positive integer. When sensing the N-th row of sub-pixels, it is needed to sense each sub-pixel in the N-th row of sub-pixels to complete the sensing of all sub-pixels in the N-th row of sub-pixels.

For example, in step S112, after the sensing of the sub-pixels in the N-th row is completed, the sub-pixels in the (N+1)-th row are sensed. That is, for two adjacent rows of sub-pixels, sub-pixels in a next row is sensed after the sensing of all sub-pixels in a previous row is completed.

In this embodiment, the sub-pixels are sensed row by row, and after all the sub-pixels in a certain row are sensed, the sub-pixels in the next row are sensed. The sensing sequence of the sub-pixels located in the same row is described below, and is not repeated here.

Figure 8:
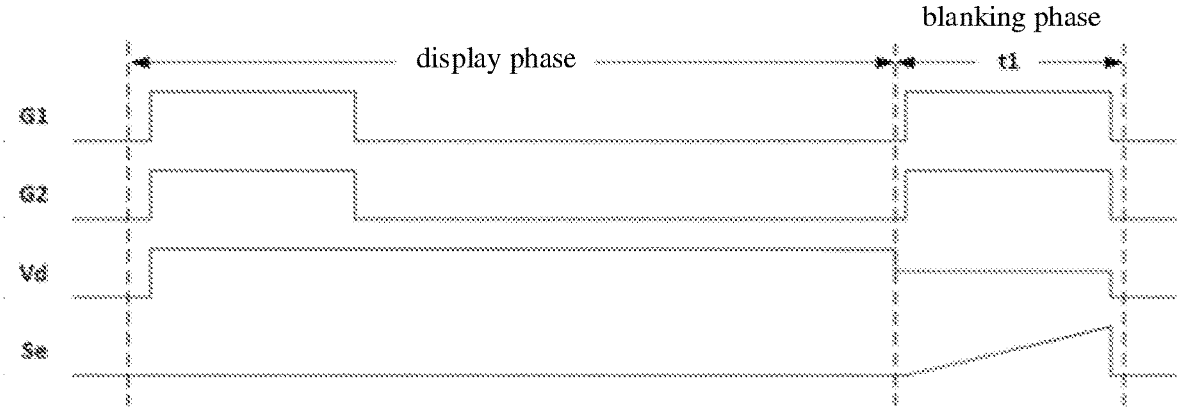
FIG. 8 is a first timing diagram of a sensing method provided by some embodiments of the present disclosure.

FIG. 8 is a first timing diagram of a sensing method provided by some embodiments of the present disclosure. As shown in FIG. 8, the driving phase of each frame of the OLED display panel 100 includes a display phase and a blanking phase.

The display phase is used for display. In the display phase, for example, progressive scanning or scanning in other ways can be performed to write display data signals of each frame into respective sub-pixels 12, thereby displaying the image of this frame. For example, the first scanning signal G1 and the second scanning signal G2 can be controlled, and the display data signal Vd can be provided, and respective transistors and the storage capacitor of the pixel circuit 120 can cooperate to enable the light-emitting element L to emit light according to the required gray scale.

The blanking phase can be used for compensation. The blanking phase is, for example, a duration after writing a last row of data in a certain frame and before starting to write a first row of data in the second frame. In the blanking phase, the display data signal is not written and is not refreshed, but the sub-pixel is sensed. For example, the sensing phase t1 of the sub-pixel is within the blanking phase. In the sensing phase t1, for a certain sub-pixel 12, by controlling the first scanning signal G1 and the second scanning signal G2 to turn on the first transistor T1 and the third transistor T3 and providing the sensing data signal Vd, the second transistor T2 can be turned on, so that the current flowing through the second transistor T2 can flow to the sensing signal line Se through the third transistor T3, and then the sensing signal line Se can output the sensing signal. Therefore, real-time compensation can be realized.

It should be noted that the signal transmitted by the data line Vd in the display phase is the display data signal, and the signal transmitted by the data line Vd in the sensing phase t1 is the sensing data signal. Because they are transmitted through the same data line Vd, both the display data signal and the sensing data signal are represented by a symbol Vd, but this does not mean that the display data signal and the sensing data signal are the same signal, the display data signal and the sensing data signal are transmitted through the data line Vd in different phases, and the display data signal and the sensing data signal can be the same or different, and the display data signal and the sensing data signal are independent of each other and do not affect each other.

It should be noted that in FIG. 8 and related descriptions, G1, G2, Vd, Se, etc. are used to indicate not only the corresponding signal lines, but also the signals transmitted on the corresponding signal lines, respectively. Similarly, in the following descriptions of FIG. 9, FIG. 10 and FIG. 12, each symbol indicates not only the corresponding signal terminal or signal line, but also the signal transmitted on the corresponding signal terminal or signal line.

For example, for the sub-pixels 12 connected to the same sensing signal line Se, the durations of the sensing phases of respective sub-pixels 12 are not exactly the same. For example, all the sub-pixels 12 may have the same sensing duration, or there may be at least one sub-pixel 12 whose sensing duration is different from that of other sub-pixels 12.

For example, if the threshold voltage of the driving transistor is to be detected, the duration of the sensing phase required for each color sub-pixel is about 30 ms: if the mobility rate of the driving transistor is to be detected, the duration of the required sensing phase ranges from about 300 μs to 600 μs. If the sizes of the driving transistors of different color sub-pixels are different, the durations of the sensing phases may also be different. For example, if the current of the driving transistor of the blue sub-pixel is relatively large and the charging duration is relatively short, the duration of the sensing phase of the blue sub-pixel may be shorter than the duration of other color sub-pixels.

Figure 9:
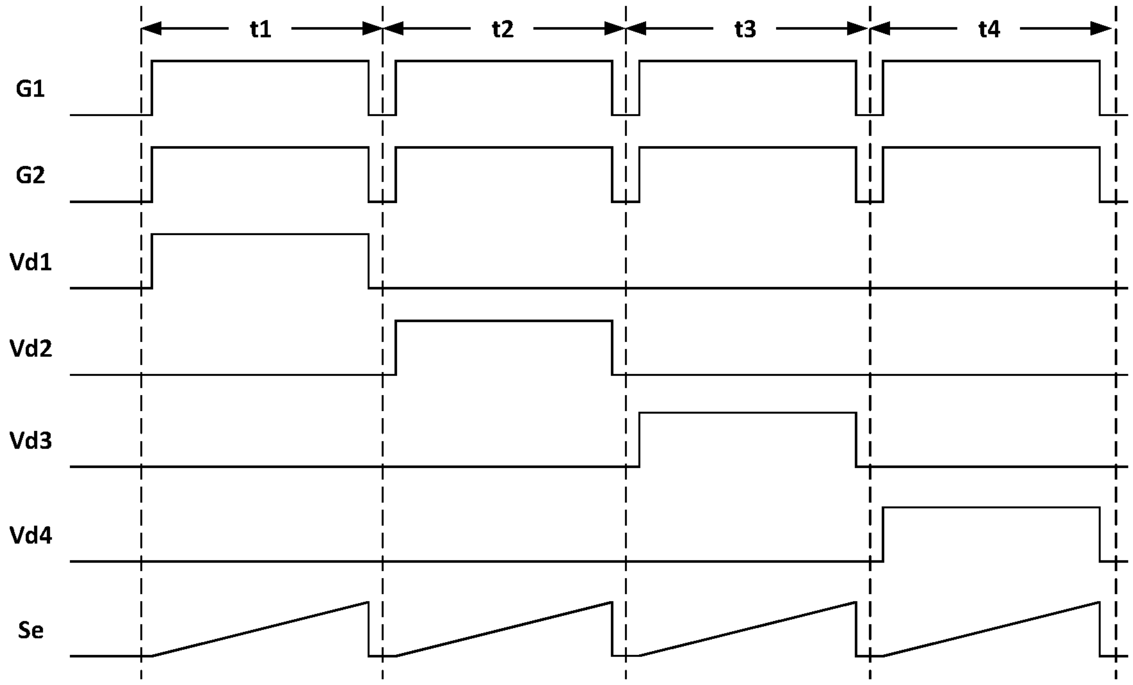
FIG. 9 is a second timing diagram of a sensing method provided by some embodiments of the present disclosure.

FIG. 9 is a second timing diagram of a sensing method provided by some embodiments of the present disclosure, and this timing is used for sensing the OLED display panel 100 with the circuit structure shown in FIG. 5, for example. As shown in FIG. 9 and FIG. 5, the sensing of one row of sub-pixels 12 is completed through four sensing phases t1-t4.

In the sensing phase t1, the first scanning signal G1 and the second scanning signal G2 are set to be an active level, and the sensing data signal is provided through the data line Vd1, and the zero-gray-scale data signal is provided through the data lines Vd2, Vd3, and Vd4. At this time, the first transistors T1 and the third transistors T3 of the four sub-pixels 12 in FIG. 5 are all turned on, but only the second transistor T2 of the first sub-pixel 12 is turned on, and the current flowing through this second transistor T2 can flow to the sensing signal line Se. The second transistors T2 in the second sub-pixel 12, the third sub-pixel 12, and the fourth sub-pixel 12, are all turned off under the control of the zero-gray-scale data signal, and no current is generated. Therefore, the sensing signal transmitted on the sensing signal line Se is the sensing signal from the first sub-pixel 12, and the sensing signal is transmitted to a separately provided circuit through the sensing signal line Se, and this circuit can detect the sensing signal and calculate based on the sensing signal, so as to be used for subsequent compensation of the first sub-pixel 12.

In the sensing phase t2, the first scanning signal G1 and the second scanning signal G2 are set to be an active level, and the sensing data signal is provided through the data line Vd2, and the zero-gray-scale data signal is provided through the data lines Vd1, Vd3, and Vd4. At this time, the first transistors T1 and the third transistors T3 of the four sub-pixels 12 in FIG. 5 are all turned on, but only the second transistor T2 of the second sub-pixel 12 is turned on, and the current flowing through this second transistor T2 can flow to the sensing signal line Se. The second transistors T2 in the first sub-pixel 12, the third sub-pixel 12, and the fourth sub-pixel 12 are all turned off under the control of the zero-gray-scale data signal, and no current is generated. Therefore, the sensing signal transmitted on the sensing signal line Se is the sensing signal from the second sub-pixel 12, and the sensing signal is transmitted to a separately provided circuit through the sensing signal line Se, and this circuit can detect the sensing signal and calculate based on the sensing signal, so as to be used for subsequent compensation of the second sub-pixel 12.

In the sensing phase t3, the first scanning signal G1 and the second scanning signal G2 are set to be an active level, and the sensing data signal is provided through the data line Vd3, and the zero-gray-scale data signal is provided through the data lines Vd1, Vd2, and Vd4. At this time, the first transistors T1 and the third transistors T3 of the four sub-pixels 12 in FIG. 5 are all turned on, but only the second transistor T2 of the third sub-pixel 12 is turned on, and the current flowing through this second transistor T2 can flow to the sensing signal line Se. The second transistor T2 in the first sub-pixel 12, the second transistor T2 in the second sub-pixel 12, and the second transistor T2 in the fourth sub-pixel 12 are all turned off under the control of the zero-gray-scale data signal, and no current is generated. Therefore, the sensing signal transmitted on the sensing signal line Se is the sensing signal from the third sub-pixel 12, and the sensing signal is transmitted to a separately provided circuit through the sensing signal line Se, and this circuit can detect the sensing signal and calculate based on the sensing signal, so as to be used for subsequent compensation of the third sub-pixel 12.

In the sensing phase t4, the first scanning signal G1 and the second scanning signal G2 are set to be an active level, and the sensing data signal is provided through the data line Vd4, and the zero-gray-scale data signal is provided through the data lines Vd1, Vd2, and Vd3. At this time, the first transistors T1 and the third transistors T3 of the four sub-pixels 12 in FIG. 5 are all turned on, but only the second transistor T2 of the fourth sub-pixel 12 is turned on, and the current flowing through the second transistor T2 can flow to the sensing signal line Se. The second transistor T2 in the first sub-pixel 12, the second transistor T2 in the second sub-pixel 12, and the second transistor T2 in the third sub-pixel 12 are all turned off under the control of the zero-gray-scale data signal, and no current is generated. Therefore, the sensing signal transmitted on the sensing signal line Se is the sensing signal from the fourth sub-pixel 12, and the sensing signal is transmitted to a separately provided circuit through the sensing signal line Se, and this circuit can detect the sensing signal and calculate based on the sensing signal, so as to be used for subsequent compensation of the fourth sub-pixel 12.

In this way, four sub-pixels 12 connected to the same sensing signal line Se can be sensed, and respective sub-pixels 12 do not influence each other. For example, the sub-pixels 12 connected to the same sensing signal line Se belong to one sensing group, and one row of sub-pixels 12 are connected to the same first scanning line G1 and the same second scanning line G2. Therefore, for sensing groups located in the same row, the first sub-pixels 12 in different sensing groups can simultaneously sense in the sensing phase t1, and the second sub-pixels 12 in different sensing groups can simultaneously sense in the sensing phase t2, and so on. Therefore, through the sensing phases t1-t4, the sensing of one row of sub-pixels 12 can be completed.

For example, the durations of the respective sensing phases t1, t2, t3, and t4 may be the same or may not be exactly the same, which may depend on the actual demand, and the embodiments of the present disclosure are not limited to this case.

For example, in some examples, for the sub-pixels of the same sensing group, the sensing phases of different sub-pixels are within the blanking phases of different frames. For example, the sensing phases t1, t2, t3, and t4 are respectively within the blanking phases of four frames, and the blanking phase of each frame only contains one sensing phase. For example, in the driving phases of four adjacent frames, the sensing phase t1 is in the blanking phase of the first frame, the sensing phase t2 is in the blanking phase of the second frame, the sensing phase t3 is in the blanking phase of the third frame, and the sensing phase t4 is in the blanking phase of the fourth frame. For example, in the blanking phase of each frame, only one sub-pixel 12 among multiple sub-pixels 12 which belong to the same one sensing group needs to be sensed. In this way, sufficient duration can be provided for the sensing of the sub-pixel 12, and it is convenient to obtain a stable and accurate sensing signal through the sensing signal line Se.

Figure 10:
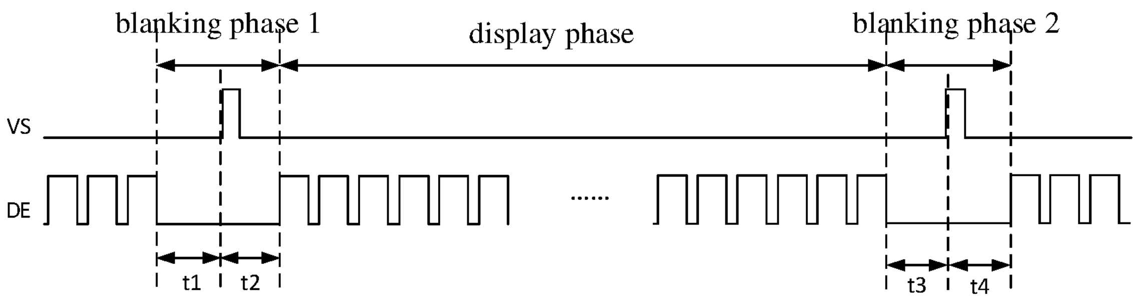
FIG. 10 is a third timing diagram of a sensing method provided by some embodiments of the present disclosure.

For example, in other examples, for the sub-pixels of the same sensing group, the sensing phases of at least two sub-pixels are within the blanking phase of the same frame. As shown in FIG. 10, the sensing phase t1 and the sensing phase t2 are within a blanking phase 1, the sensing phase t3 and the sensing phase t4 are within a blanking phase 2, and the blanking phase 1 and the blanking phase 2 are blanking phases of different frames. That is, the blanking phase of each frame includes two sensing phases, and in the blanking phase of each frame, it is needed to sense two sub-pixels 12 among multiple sub-pixels 12 which belong to the same one sensing group. In this way, the sensing speed can be accelerated and the sensing efficiency can be improved. A frame synchronization signal VS and a data enable signal DE in FIG. 10 are used to control the scanning of each frame, and the description of the frame synchronization signal VS and the data enable signal DE can be referred to the conventional design and is not be described in detail here.

It should be noted that the sensing phases of two sub-pixels 12 belonging to the same sensing group can be within the blanking phase of the same frame: alternatively, the sensing phases of three sub-pixels 12 belonging to the same sensing group can be within the blanking phase of the same frame: alternatively, the sensing phases of four sub-pixels 12 belonging to the same sensing group can be within the blanking phase of the same frame: alternatively, the sensing phase of any amount of sub-pixels 12 belonging to the same sensing group can be within the blanking phase of the same frame, which can be determined according to the duration of the sensing phase and the duration of the blanking phase, and the embodiments of the present disclosure are not limited to this case. In this way, the flexibility of setting the sensing phase can be improved, and diversified application requirements can be met.

For example, in some examples, the sub-pixels 12 connected to the same sensing signal line Se belong to one sensing group. For the sub-pixels 12 of the same sensing group, the sub-pixels 12 of the same sensing group are sequentially sensed along the row direction. Taking the OLED display panel 100 shown in FIG. 2 as an example, four sub-pixels 12 in each pixel unit 11 are connected to the same sensing signal line Se, and four sub-pixels 12 in each pixel unit 11 belong to one sensing group. For the sub-pixels 12 of the same sensing group, respective sub-pixels 12 in the sensing group can be sensed in the order of R-G-B-W along the row direction.

Because different sensing groups do not share the sensing signal line Se, all the red sub-pixels R in one row of sub-pixels 12 can be sensed at the same time, all the green sub-pixels G in one row of sub-pixels 12 can be sensed at the same time, and so on. After four times of sensing, all the sub-pixels 12 in this row complete sensing. When all the sub-pixels 12 in one row are sensed, the sub-pixels 12 in the next row are sensed in a similar way, and so on. Therefore, the sensing of all sub-pixels 12 in the OLED display panel 100 can be completed.

In this way, the detection interval duration of four color sub-pixels can be very short, and the data of four color sub-pixels can be updated basically at the same time, so the color shift caused by updating single color data may not occur. Moreover, the method is easy to control and realize. It should be noted that in this embodiment, the sensing can also be performed in the order of W-B-G-R along the row direction, which can be determined according to actual requirements, and the embodiments of the present disclosure are not limited to this case.

For example, in other examples, the sub-pixels 12 connected to the same sensing signal line Se belong to one sensing group. For the sub-pixels 12 of the same sensing group, the sub-pixels 12 of the same sensing group are sensed according to a preset order, which is different from the order in which the sub-pixels 12 are arranged in the row direction. Still taking the OLED display panel 100 shown in FIG. 2 as an example, four sub-pixels 12 in each pixel unit 11 are connected to a same one sensing signal line Se, and four sub-pixels 12 in each pixel unit 11 belong to one sensing group. For the sub-pixels 12 of the same sensing group, the sub-pixels 12 can be sensed according to a preset order, such as R-B-G-W, R-W-B-G, etc., as long as the preset order is different from R-G-B-W or W-B-G-R.

Because different sensing groups do not share the sensing signal line Se, all the red sub-pixels R in one row of sub-pixels 12 can be sensed at the same time, all the green sub-pixels G in one row of sub-pixels 12 can be sensed at the same time, and so on. After four times of sensing, all the sub-pixels 12 in this row complete the sensing. When all the sub-pixels 12 in one row are sensed, the sub-pixels 12 in the next row are sensed in a similar way, and so on. Therefore, the sensing of all sub-pixels 12 in the OLED display panel 100 can be completed. In this way, the flexibility can be improved and various application requirements can be easily met.

Figure 11:
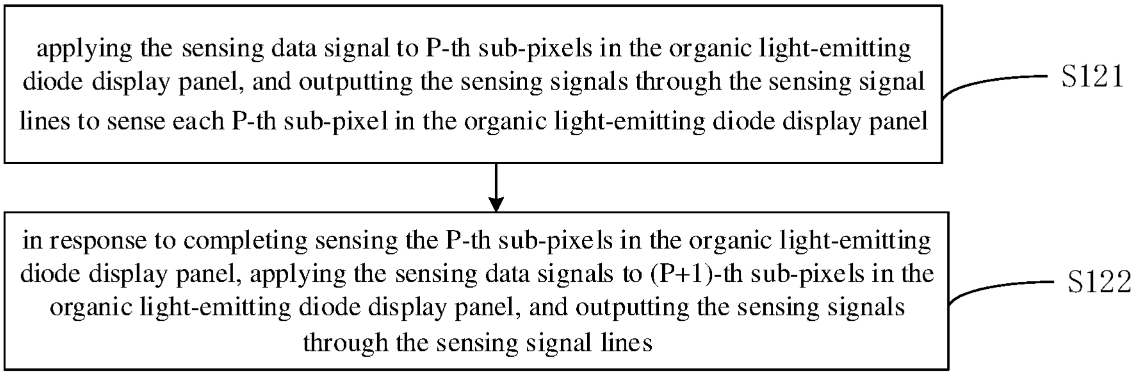
FIG. 11 is a schematic flowchart of step S10 in FIG. 6.

FIG. 11 is a schematic flowchart of step S10 in FIG. 6. For example, in some examples, the sub-pixels 12 connected to the same sensing signal line Se belong to one sensing group, and the sub-pixels 12 of the same sensing group are numbered from the first sub-pixel to an M-th sub-pixel, where $M>1$ and M is an integer. As shown in FIG. 11, the above step S10 may further include following operations.

Step S121: applying the sensing data signals to P-th sub-pixels in the organic light-emitting diode display panel, and outputting the sensing signals through the sensing signal lines Se, so as to sense each P-th sub-pixel in the organic light-emitting diode display panel:

Step S122: in response to completing sensing the P-th sub-pixels in the organic light-emitting diode display panel, applying the sensing data signals to (P+1)-th sub-pixels in the organic light-emitting diode display panel, and outputting the sensing signals through the sensing signal lines.

For example, $1 \le P \le M-1$ and p is an integer.

For example, taking the OLED display panel 100 shown in FIG. 2 as an example, four sub-pixels 12 in each pixel unit 11 are connected to the same sensing signal line Se, and four sub-pixels 12 in each pixel unit 11 belong to one sensing group. The sub-pixels 12 of the same sensing group are numbered from the first sub-pixel to the fourth sub-pixel, where $M=4$. For example, the red sub-pixel R is the first sub-pixel, the green sub-pixel G is the second sub-pixel, the blue sub-pixel B is the third sub-pixel, and the white sub-pixel W is the fourth sub-pixel.

In step S121, a sensing data signal is applied to the first sub-pixel in the OLED display panel 100, and the sensing signal is output through the sensing signal line Se, thereby sensing each first sub-pixel in the OLED display panel 100. At this time, P=1. For example, the sensing data signals may be applied to the P-th sub-pixels (e.g., the first sub-pixels) row by row, and the sensing signals may be output through the sensing signal lines Se. The sensing sequence of a plurality of first sub-pixels is described later and is not repeated here.

In step S122, after the sensing of the first sub-pixels in the OLED display panel 100 is completed, that is, after the sensing of all the first sub-pixels is completed, the sensing data signals are applied to the second sub-pixels in the OLED display panel 100, and the sensing signals are output through the sensing signal lines Se. By analogy, after all the second sub-pixels are sensed, the third sub-pixels are to be sensed, and after all the third sub-pixels are sensed, the fourth sub-pixels are to be sensed.

For example, a driving phase of each frame of the OLED display panel 100 includes a display phase and a blanking phase, and the sensing phase of sub-pixel 12 is within the blanking phase. For example, for the sub-pixels 12 of the same sensing group, the sensing phases of different sub-pixels 12 are within the blanking phases of different frames, or the sensing phases of at least two sub-pixels 12 are within the blanking phases of the same frame. For the description of the display phase, the blanking phase, and the sensing phase, the above description of FIG. 8 and FIG. 10 can be referred to, which is not repeated here.

Figure 12:
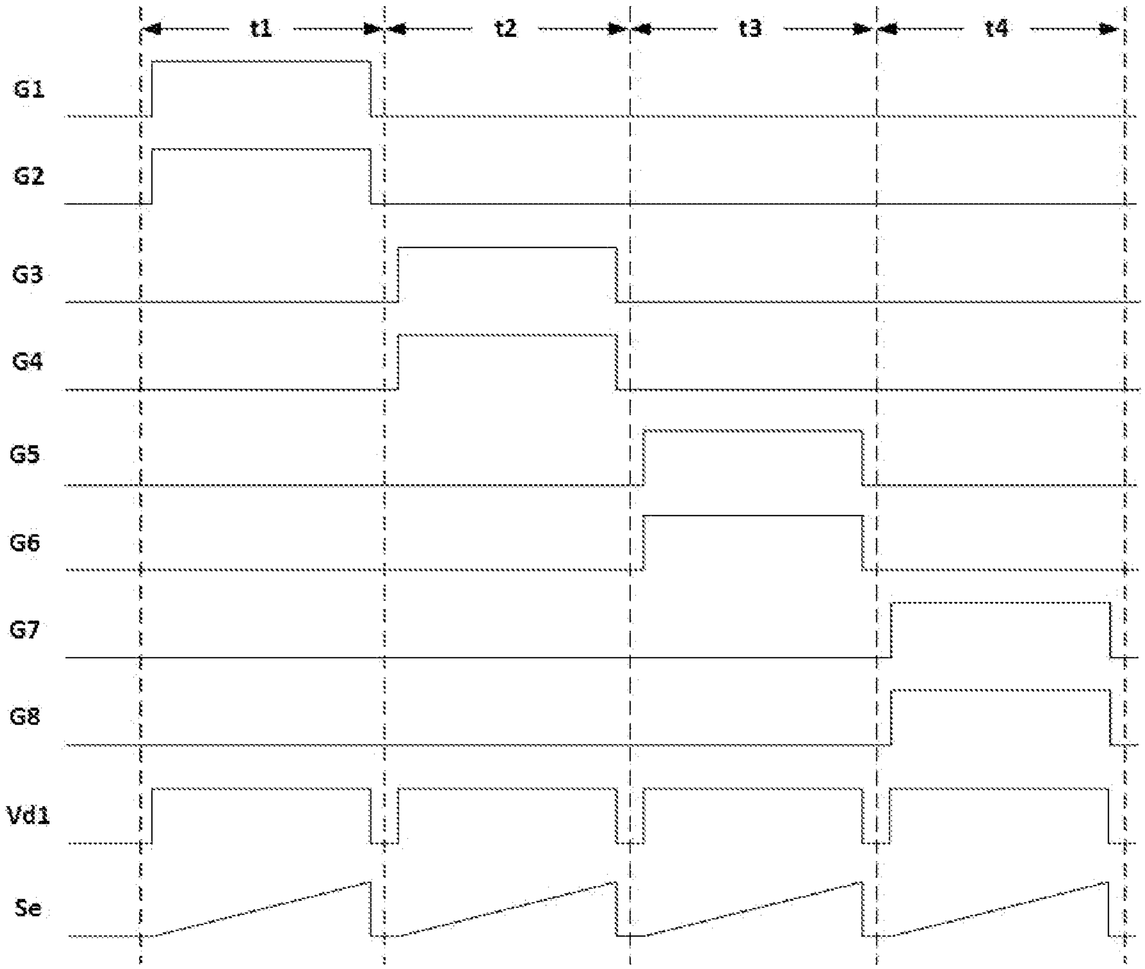
FIG. 12 is a fourth timing diagram of a sensing method provided by some embodiments of the present disclosure.

FIG. 12 is a fourth timing diagram of a sensing method provided by some embodiments of the present disclosure, and this timing is used for sensing the OLED display panel 100 with the circuit structure shown in FIG. 5, for example. For example, the four sub-pixels 12 in FIG. 5 are numbered as the first sub-pixel to the fourth sub-pixel from left to right.

As shown in FIG. 12 and FIG. 5, for the sub-pixels 12 of the same sensing group, different sub-pixels 12 are sensed in different sensing phases.

In the sensing phase t1, the first scanning signal G1 and the second scanning signal G2 supplied to the first row of sub-pixels 12 are set to be an active level, and the sensing data signal is supplied through the data line Vd1, and the zero-gray-scale data signal (not shown in the figure) is supplied through the data lines Vd2, Vd3, and Vd4. At this time, the first transistors T1 and the third transistors T3 of the four sub-pixels 12 in FIG. 5 are all turned on, but only the second transistor T2 of the first sub-pixel is turned on, and the current flowing through this second transistor T2 can flow to the sensing signal line Se. The second transistor T2 in the second sub-pixel, the second transistor T2 in the third sub-pixel, and the second transistor T2 in the fourth sub-pixel are all turned off under the control of the zero-gray-scale data signal, and no current is generated. Therefore, the sensing signal transmitted on the sensing signal line Se is the sensing signal from the first sub-pixel, and the sensing signal is transmitted to a separately provided circuit through the sensing signal line Se, and this circuit can detect the sensing signal and calculate based on the sensing signal, so as to be used for subsequent compensation of the first sub-pixel. Because different sensing groups do not share the sensing signal line Se, all the first sub-pixels in one row of sub-pixels 12 (for example, all the red sub-pixels R) can be sensed at the same time.

In the sensing phase t2, the first scanning signal G3 and the second scanning signal G4 supplied to the second row of sub-pixels 12 are set to be an active level, and the sensing data signal is supplied through the data line Vd1, and the zero-gray-scale data signal (not shown in the figure) is supplied through the data lines Vd2, Vd3, and Vd4. For example, the first scanning signal G3 is used to control whether the first transistor T1 is turned on. The function of the first scanning signal G3 is basically the same as the function of the first scanning signal G1, except that the first scanning signal G1 and the first scanning signal G3 are signals provided to different rows respectively. For example, the second scanning signal G4 is used to control whether the third transistor T3 is turned on, and the function of the second scanning signal G4 is basically the same as the function of the second scanning signal G2, except that the second scanning signal G2 and the second scanning signal G4 are signals provided to different rows respectively. At this time, all the first sub-pixels in the second row of sub-pixels 12 are sensed.

In the sensing phase t3, the first scanning signal G5 and the second scanning signal G6 supplied to the third row of sub-pixels 12 are set to be an active level, and the sensing data signal is supplied through the data line Vd1, and the zero-gray-scale data signal (not shown in the figure) is supplied through the data lines Vd2, Vd3, and Vd4. For example, the first scanning signal G5 is used to control whether the first transistor T1 is turned on. The function of the first scanning signal G5 is basically the same as the function of the first scanning signal G1, except that the first scanning signal G1 and the first scanning signal G5 are signals provided to different rows respectively. For example, the second scanning signal G6 is used to control whether the third transistor T3 is turned on, and the function of the second scanning signal G6 is basically the same as the function of the second scanning signal G2, except that the second scanning signal G2 and the second scanning signal G6 are signals provided to different rows respectively. At this time, all the first sub-pixels in the third row of sub-pixels 12 are sensed.

In the sensing phase t4, the first scanning signal G7 and the second scanning signal G8 supplied to the fourth row of sub-pixels 12 are set to be an active level, and the sensing data signal is supplied through the data line Vd1, and zero-gray-scale data signal (not shown in the figure) is supplied through the data lines Vd2, Vd3, and Vd4. For example, the first scanning signal G7 is used to control whether the first transistor T1 is turned on. The function of the first scanning signal G7 is basically the same as the function of the first scanning signal G1, except that the first scanning signal G1 and the first scanning signal G7 are signals provided to different rows respectively. For example, the second scanning signal G8 is used to control whether the third transistor T3 is turned on, and the function of the second scanning signal G8 is basically the same as the function of the second scanning signal G2, except that the second scanning signal G2 and the second scanning signal G8 are signals provided to different rows respectively. At this time, all the first sub-pixels in the fourth row of sub-pixels 12 are sensed.

The first sub-pixels are sensed row by row in the above manner, and the first sub-pixels in the same row are sensed at the same time. For example, from the first row to the last row, the first sub-pixels are sensed row by row, then the second sub-pixels are sensed row by row from the first row, then the third sub-pixels are sensed row by row from the first row, and so on. That is, in this embodiment, the P-th sub-pixels located in the same row are simultaneously sensed, and the P-th sub-pixels located in the same column are sequentially sensed along the column direction.

In this way, the sensing duration interval between the sub-pixels 12 connected to the same sensing signal line Se is relatively long, which can effectively avoid the influence of residual charge on the sensing signal line Se, avoid signal interference, and improve the detection accuracy.

For example, in some examples, for the P-th sub-pixels located in a same column, sensing phases of different P-th sub-pixels are within blanking phases of different frame. That is, the sensing phases t1, t2, t3, and t4 in FIG. 12 are respectively within the blanking phases of different frames. In this way, sufficient duration can be provided for the sensing of the sub-pixels 12, which is convenient to obtain a stable and accurate sensing signal through the sensing signal line Se.

For example, in other examples, for the P-th sub-pixels located in the same column, sensing phases of at least two P-th sub-pixels are within a blanking phase of a same frame. That is, at least two of the sensing phases t1, t2, t3, and t4 in FIG. 12 are within the blanking phase of the same frame. In this way, the flexibility of setting the sensing phase can be improved, and diversified application requirements can be met. As for the relationship between the sensing phase and the blanking phase, the above contents can be referred to, which is not repeated here.

For example, in some examples, for the sub-pixels 12 of the same sensing group, the first sub-pixel to the M-th sub-pixel are sequentially arranged along the row direction. Taking the OLED display panel 100 shown in FIG. 2 as an example, the first sub-pixel to the fourth sub-pixel (where M=4) are a red sub-pixel R, a green sub-pixel G, a blue sub-pixel B, and a white sub-pixel W, respectively.

For example, in other examples, the first sub-pixel to the M-th sub-pixel are arranged out of order along the row direction. Taking the OLED display panel 100 shown in FIG. 2 as an example, the first sub-pixel to the fourth sub-pixel (where M=4) can be a red sub-pixel R, a blue sub-pixel B, a green sub-pixel G, and a white sub-pixel W, respectively, or can also be a red sub-pixel R, a white sub-pixel W, a blue sub-pixel B, and a green sub-pixel G, respectively, or in any other arbitrary order, as long as they are not R-G-B-W or W-B-G-R. For example, in the case where the first sub-pixel to the fourth sub-pixel (where M=4) are a red sub-pixel R, a blue sub-pixel B, a green sub-pixel G, and a white sub-pixel W, respectively, when performing sensing, it is needed to complete the sensing of the red sub-pixels R row by row, then complete the sensing of the blue sub-pixels B row by row, then complete the sensing of the green sub-pixels G row by row, and finally complete the sensing of the white sub-pixels W row by row. In the case where the sub-pixels are numbered in other order, the sensing of a certain color of sub-pixels is completed row by row in a similar way, and then the sensing of another color of sub-pixels is completed row by row.

It should be noted that in the above description, although it is taken as an example that the sensing phase is within the blanking phase, this case does not constitute a limitation to the embodiments of the present disclosure. In other embodiments, the sensing phase of the sub-pixel 12 is within the shutdown compensation phase of the OLED display panel 100, but not within the blanking phase, thereby realizing shutdown compensation. When the OLED display panel 100 receives a shutdown command, it enters the shutdown compensation phase. In the shutdown compensation phase, respective sub-pixels 12 can be sensed in the way as shown in FIG. 9 or FIG. 12, so as to realize shutdown compensation.

It should be noted that in the embodiments of the present disclosure, the sensing method for the OLED display panel 100 is not limited to the steps and sequences described above, but can also include more steps, and the sequence of respective steps can be set according to actual requirements, which is not limited by the embodiments of the present disclosure.

At least one embodiment of the present disclosure also provides a driving method for an organic light-emitting diode display panel. By using the driving method, the organic light-emitting diode display panel can perform displaying, and the organic light-emitting diode display panel can be sensed by the sensing method described above to realize compensation. The driving method can not only reduce the amount of sensing signal lines and improve the pixel aperture ratio, but also realize the sensing of full-screen sub-pixels, improve the sensing efficiency, improve the sensing stability, and realize real-time compensation or shutdown compensation.

Figure 13:
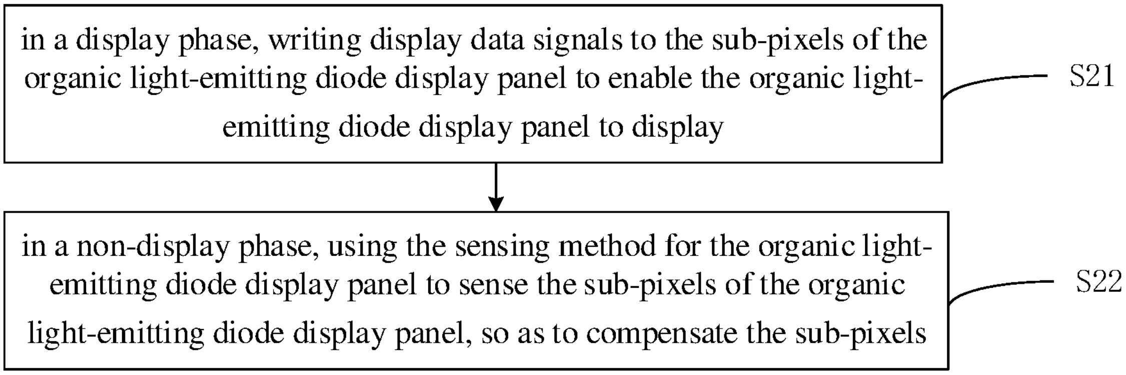
FIG. 13 is a schematic flowchart of a driving method for an organic light-emitting diode display panel provided by some embodiments of the present disclosure.

FIG. 13 is a flowchart of a driving method for an organic light-emitting diode display panel provided by some embodiments of the present disclosure. For example, in some examples, as shown in FIG. 13, the driving method includes following operations.

Step S21: in a display phase, writing display data signals to the sub-pixels of the organic light-emitting diode display panel so as to enable the organic light-emitting diode display panel to display:

Step S22: in a non-display phase, using the sensing method for the organic light-emitting diode display panel to sense the sub-pixels of the organic light-emitting diode display panel, so as to compensate the sub-pixels.

For example, in step S21, in the display phase, the display data signals can be written to the OLED display panel by progressive scanning or other scanning methods, so that the OLED display panel can display the required image. The detailed description of driving the OLED display panel to display can be referred to the conventional design, which is not described here.

For example, in step S22, in the non-display phase, the sub-pixels of the OLED display panel can be sensed by using the sensing method provided by the above embodiments, so as to compensate the sub-pixels. The detailed description of the sensing method can be referred to the above description, which is not repeated here. For example, the non-display phase can be the blanking phase, so that real-time compensation can be realized. For example, the non-display phase can also be the shutdown compensation phase, so that shutdown compensation can be realized.

For example, the driving method is not limited to the steps and sequence described above, but also includes more steps, and the sequence of respective steps can be set according to actual requirements, which is not limited by the embodiments of the present disclosure. The detailed description and technical effect of this driving method can be referred to the above detailed description of the sensing method, which may not be repeated here.

At least one embodiment of the present disclosure also provides an organic light-emitting diode display panel. The organic light-emitting diode display panel can not only display, but also perform sensing to realize compensation. The organic light-emitting diode display panel can realize full-screen sub-pixel sensing while reducing the amount of sensing signal lines and improving the pixel aperture ratio, and can improve the sensing efficiency, improve the sensing stability, and realize real-time compensation or shutdown compensation.

Figure 14:
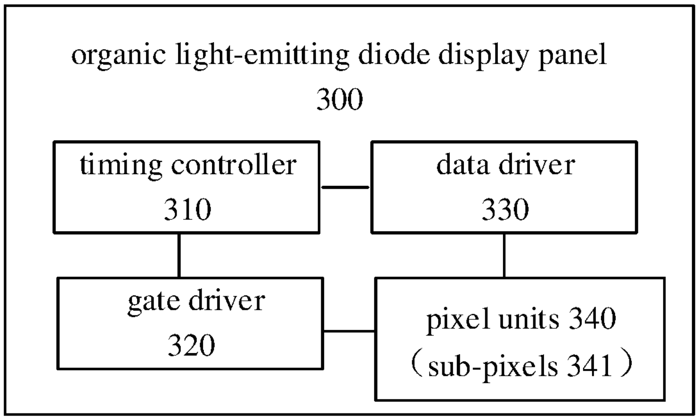
FIG. 14 is a schematic block diagram of an organic light-emitting diode display panel provided by some embodiments of the present disclosure.

FIG. 14 is a schematic block diagram of an organic light-emitting diode display panel provided by some embodiments of the present disclosure. As shown in FIG. 14, the organic light-emitting diode display panel 300 includes a timing controller 310, a gate driver 320, a data driver 330, and a plurality of pixel units 340 arranged in an array. Each pixel unit 340 includes a plurality of sub-pixels 341, and at least two sub-pixels 341 are connected to the same sensing signal line Se.

For example, the timing controller 310 is connected to the gate driver 320 and the data driver 330. The timing controller 310 is configured to provide the first control signal to the gate driver 320 so as to control the gate driver 320 to output the first scanning signal and the second scanning signal, and provide the second control signal to the data driver 330 so as to control the data driver 330 to output the sensing data signal and the zero-gray-scale data signal. For example, the timing controller 310, the gate driver 320, and the data driver 330 are basically the same as the timing controller 202, the gate driver 204, and the data driver 203 shown in FIG. 4, respectively. The first control signal can be the aforementioned clock signal, the scanning start signal, the sensing start signal, etc., and the second control signal can be the aforementioned gray value, the control signal, etc. The related descriptions can be referred to the above description of FIG. 4 and will not be repeated here.

For example, the gate driver 320 is configured to apply the first scanning signal and the second scanning signal to the sub-pixels 341 in the organic light-emitting diode display panel 300 under the control of the first control signal. For example, the sub-pixel 341 is basically the same as the sub-pixel Pxij shown in FIG. 4, and is not described in detail here. For example, the data driver 330 is configured to apply the sensing data signal and the zero-gray-scale data signal to the sub-pixels 341 in the organic light-emitting diode display panel 300 under the control of the second control signal.

For example, the sub-pixel 341 outputs the sensing signals through the sensing signal line Se in response to the first scanning signal, the second scanning signal, and the sensing data signal, to realize the sensing of the sub-pixel 341, so as to compensate the sub-pixels. For example, among the sub-pixels 341 connected to the same sensing signal line Se, the sub-pixels 341, other than the sub-pixel 341 which is currently sensed, are applied with the zero-gray-scale data signal. The sensing method of the sub-pixel 341 can be referred to the above description of FIG. 6, which is not repeated here.

For example, in some examples, the gate driver 320 is further configured to apply the first scanning signal and the second scanning signal to an N-th row of sub-pixels for multiple times under the control of the first control signal, where N is a positive integer. The data driver 330 is further configured to respectively apply the sensing data signal to each sub-pixel in the N-th row of sub-pixels under the control of the second control signal. For example, the N-th row of sub-pixels are not applied with the sensing data signal at the same time. For example, for the plurality of sub-pixels 341 connected to the same sensing signal line Se, only one sub-pixel 341 is applied with a sensing data signal at the same time, while other sub-pixels 341 are applied with the zero-gray-scale data signal.

For example, after each sub-pixel in the N-th row of sub-pixels outputs a sensing signal through the sensing signal line Se to complete the sensing of the N-th row of sub-pixels, an (N+1)-th row of sub-pixels receives signals (such as the first scanning signal, the second scanning signal, the sensing data signal, the zero-gray-scale data signal, etc.) provided by the gate driver 320 and the data driver 330 and starts sensing.

In this example, the sub-pixels 341 are sensed row by row, and after all the sub-pixels 341 in one row are completely sensed, the sub-pixels 341 in the next row are sensed. In this way, the sensing of multiple sub-pixels 341 connected to the same sensing signal line Se can be realized, and respective sub-pixels 341 do not influence each other. The detection interval duration of the plurality of sub-pixels 341 connected to the same sensing signal line Se is very short, and respective sub-pixels 341 update data basically at the same time, so there is no color shift caused by updating single color data. Moreover, the method is easy to control and realize. The detailed description of this sensing mode can be referred to the above description of FIG. 7 to FIG. 10, which is not repeated here.

For example, in other examples, the sub-pixels 341 connected to the same sensing signal line Se belong to one sensing group, and the sub-pixels 341 of the same sensing group are numbered from a first sub-pixel to an M-th sub-pixel, where M>1 and M is an integer.

For example, the gate driver 320 is further configured to output the first scanning signal and the second scanning signal row by row under the control of the first control signal. The data driver 330 is also configured to apply the sensing data signal to the P-th sub-pixels in the organic light-emitting diode display panel 300 under the control of the second control signal.

For example, after each P-th sub-pixel in the organic light-emitting diode display panel 300 outputs the sensing signal through the sensing signal line Se to complete the sensing of each P-th sub-pixel, (P+1)-th sub-pixels in the organic light-emitting diode display panel 300 receive signals provided by the gate driver 320 and the data driver 330 and starts sensing. For example, $1 \le P \le M-1$ and P is an integer.

The first sub-pixels are sensed row by row in the above manner, and the first sub-pixels in the same row are sensed at the same time. For example, from the first row to the last row, the first sub-pixels are completely sensed row by row, then the second sub-pixels are completely sensed row by row from the first row, then the third sub-pixels are completely sensed row by row from the first row, and so on. That is, in this embodiment, the P-th sub-pixels located in the same row are simultaneously sensed, and the P-th sub-pixels located in the same column are sequentially sensed along the column direction.

In this way, the sensing duration interval between the sub-pixels 341 connected to the same sensing signal line Se is relatively long, which can effectively avoid the influence of residual charge on the sensing signal line Se, avoid signal interference, and improve the detection accuracy. The detailed description of this sensing mode can be referred to the above description of FIG. 11 and FIG. 12, which is not repeated here.

The detailed description and technical effects of the organic light-emitting diode display panel 300 can be referred to the above description of the sensing method, the driving method and the display panel shown in FIG. 4, which may not be repeated here.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What are described above is related to the illustrative embodiments of the disclosure only and not limitative to the scope of the disclosure; the scopes of the disclosure are defined by the accompanying claims.

What is claimed is:

1. A sensing method for an organic light-emitting diode display panel, wherein the organic light-emitting diode display panel comprises a plurality of pixel units arranged in an array, each pixel unit comprises a plurality of sub-pixels, at least two sub-pixels are connected to a same sensing signal line, and the method comprises:

sequentially applying sensing data signals to the sub-pixels in the organic light-emitting diode display panel, and sequentially outputting sensing signals through sensing signal lines, to sense the sub-pixels, so as to compensate the sub-pixels, wherein among the sub-pixels connected to the same sensing signal line, sub-pixels, other than a sub-pixel which is currently sensed, are applied with a zero-gray-scale data signal.

2. The method according to claim 1, wherein sequentially applying the sensing data signals to the sub-pixels in the organic light-emitting diode display panel, and sequentially outputting the sensing signals through the sensing signal lines, comprises:

sequentially applying the sensing data signals to an N-th row of sub-pixels, and sequentially outputting the sensing signals through the sensing signal lines to sense each sub- pixel among the N-th row of sub-pixels; and in response to completing sensing of the N-th row of sub-pixels, sequentially applying the sensing data signals to an (N+1)-th row of sub-pixels, and sequentially outputting the sensing signals through the sensing signal lines, where N is a positive integer.

3. The method according to claim 2, wherein a driving phase of each frame of the organic light-emitting diode display panel comprises a display phase and a blanking phase, and a sensing phase of the sub-pixels is within the blanking phase.

4. The method according to claim 3, wherein the sub-pixels connected to the same sensing signal line belong to one sensing group, and for the sub-pixels of a same sensing group, sensing phases of different sub-pixels are within blanking phases of different frames, or sensing phases of at least two sub-pixels are within the blanking phase of a same frame.

5. The method according to claim 2, wherein the sub-pixels connected to the same sensing signal line belong to one sensing group, and for the sub-pixels of a same sensing group, the sub-pixels are sequentially sensed along a row direction.

6. The method according to claim 2, wherein the sub-pixels connected to the same sensing signal line belong to one sensing group, and for the sub-pixels of a same sensing group, the sub-pixels are sensed according to a preset order, and the preset order is different from an order in which the sub-pixels are arranged along a row direction.

7. The method according to claim 2, wherein the sub-pixels connected to the same sensing signal line belong to a same pixel unit or belong to different pixel units, and the sub-pixels of each pixel unit are in a same row.

8. The method according to claim 2, wherein for the sub-pixels connected to the same sensing signal line, durations of sensing phases of respective sub-pixels are not exactly identical.

9. The method according to claim 2, wherein each pixel unit comprises four sub-pixels, and the four sub-pixels comprise a red sub-pixel, a green sub-pixel, a blue sub-pixel, and a white sub-pixel.

10. The method according to claim 2, wherein each sub-pixel comprises a pixel circuit, and the pixel circuit comprises a driving circuit, a data writing circuit, a storage circuit, and a sensing circuit;

the driving circuit is connected to a light-emitting element and is configured to control a driving current for driving the light-emitting element to emit light;

the data writing circuit is connected to the driving circuit and is configured to write a sensing data signal, the zero-gray-scale data signal, or a display data signal into the driving circuit in response to a first scanning signal;

the storage circuit is connected to the driving circuit and the data writing circuit, and is configured to store the sensing data signal, the zero-gray-scale data signal, or the display data signal written by the data writing circuit; and the sensing circuit is connected to the driving circuit, the light-emitting element, and the sensing signal line, and is configured to transmit a signal flowing through the driving circuit to the sensing signal line in response to a second scanning signal, so as to output a sensing signal through the sensing signal line.

11. The method according to claim 1, wherein the sub-pixels connected to the same sensing signal line belong to one sensing group, and the sub-pixels of a same sensing group are numbered from a first sub-pixel to an M-th sub-pixel, sequentially applying the sensing data signals to the sub-pixels in the organic light-emitting diode display panel, and sequentially outputting the sensing signals through the sensing signal lines, comprises:

applying the sensing data signals to P-th sub-pixels in the organic light-emitting diode display panel, and outputting the sensing signals through the sensing signal lines, to sense each P-th sub-pixel in the organic light-emitting diode display panel; and in response to completing sensing the P-th sub-pixels in the organic light-emitting diode display panel, applying the sensing data signals to (P+1)-th sub-pixels in the organic light-emitting diode display panel, and outputting the sensing signals through the sensing signal lines, where $M>1$ and M is an integer, $1 \le P \le M-1$ and P is an integer.

12. The method according to claim 11, wherein applying the sensing data signals to the P-th sub-pixels in the organic light-emitting diode display panel, and outputting the sensing signals through the sensing signal lines, comprises:

applying the sensing data signals to the P-th sub-pixels row by row, and outputting the sensing signals through the sensing signal lines.

13. The method according to claim 11, wherein a driving phase of each frame of the organic light-emitting diode display panel comprises a display phase and a blanking phase, and a sensing phase of the sub-pixels is within the blanking phase.

14. The method according to claim 13, wherein for P-th sub-pixels in a same column, sensing phases of different P-th sub-pixels are within blanking phases of different frames, or sensing phases of at least two P-th sub-pixels are within the blanking phase of a same frame.

15. The method according to claim 11, wherein P-th sub-pixels in a same row are simultaneously sensed, and for P-th sub-pixels in a same column, the P-th sub-pixels are sequentially sensed along a column direction.

16. The method according to claim 11, wherein for the sub-pixels of the same sensing group, the first sub-pixel to the M-th sub-pixel are sequentially arranged along a row direction, or, the first sub-pixel to the M-th sub-pixel are arranged out of order along the row direction.

17. The method according to claim 1, wherein a sensing phase of the sub-pixels is within a shutdown compensation phase of the organic light-emitting diode display panel.

18. A driving method for an organic light-emitting diode display panel, comprising:

in a display phase, writing display data signals to the sub-pixels of the organic light-emitting diode display panel to enable the organic light-emitting diode display panel to display; and in a non-display phase, using the sensing method for the organic light-emitting diode display panel according to claim 1 to sense the sub-pixels of the organic light-emitting diode display panel, so as to compensate the sub-pixels.

19. An organic light-emitting diode display panel, comprising a timing controller, a gate driver, a data driver, and a plurality of pixel units arranged in an array, wherein each pixel unit comprises a plurality of sub-pixels, and at least two sub-pixels are connected to a same sensing signal line;

the timing controller is connected to the gate driver and the data driver, and the timing controller is configured to provide a first control signal to the gate driver to control the gate driver to output a first scanning signal and a second scanning signal, and provide a second control signal to the data driver to control the data driver to output a sensing data signal and a zero-gray-scale data signal;

the gate driver is configured to apply the first scanning signal and the second scanning signal to the sub-pixels in the organic light-emitting diode display panel under control of the first control signal;

the data driver is configured to apply the sensing data signal and the zero-gray-scale data signal to the sub-pixels in the organic light-emitting diode display panel under control of the second control signal; and the sub-pixels output sensing signals through sensing signal lines in response to the first scanning signal, the second scanning signal, and the sensing data signal, to realize sensing of the sub-pixels, so as to compensate the sub-pixels, wherein among the sub-pixels connected to the same sensing signal line, sub-pixels, other than a sub-pixel which is currently sensed, are applied with the zero-gray-scale data signal.

20. The organic light-emitting diode display panel according to claim 19, wherein the gate driver is further configured to apply the first scanning signal and the second scanning signal to an N-th row of sub-pixels for multiple times under control of the first control signal;

the data driver is further configured to apply the sensing data signal to each sub-pixel in the N-th row of sub-pixels respectively under control of the second control signal, and the N-th row of sub-pixels are not applied with the sensing data signal at same time; and after each sub-pixel in the N-th row of sub-pixels outputs the sensing signals through the sensing signal lines to complete sensing of the N-th row of sub-pixels, an (N+1)-th row of sub-pixels receive signals provided by the gate driver and the data driver and start sensing, where N is a positive integer.

* * * * *